US012361508B2

(12) United States Patent
Persson

(10) Patent No.: US 12,361,508 B2
(45) Date of Patent: Jul. 15, 2025

(54) METHODS OF AND APPARATUS FOR STORING DATA IN MEMORY IN GRAPHICS PROCESSING SYSTEMS

(71) Applicant: Arm Limited, Cambridge (GB)

(72) Inventor: Håkan Lars-Göran Persson, Skåne (SE)

(73) Assignee: Arm Limited, Cambridge (GB)

( * ) Notice: Subject to any disclaimer, the term of this patent is extended or adjusted under 35 U.S.C. 154(b) by 531 days.

(21) Appl. No.: 17/805,333

(22) Filed: Jun. 3, 2022

(65) Prior Publication Data

US 2022/0398686 A1    Dec. 15, 2022

(30) Foreign Application Priority Data

Jun. 9, 2021   (GB) ..................................... 2108235

(51) Int. Cl.
*G06T 1/60*        (2006.01)
*G06T 15/04*       (2011.01)

(52) U.S. Cl.
CPC .............. *G06T 1/60* (2013.01); *G06T 15/04* (2013.01)

(58) Field of Classification Search
CPC .................................. G06T 1/60; G06T 15/04
See application file for complete search history.

(56) References Cited

U.S. PATENT DOCUMENTS

| | | | | |
|---|---|---|---|---|
| 5,339,411 | A * | 8/1994 | Heaton, Jr. ........... | G06F 12/023 711/171 |
| 6,088,777 | A * | 7/2000 | Sorber .................. | G06F 12/023 711/171 |
| 6,853,382 | B1 | 2/2005 | Van Dyke et al. | |
| 10,133,688 | B2 * | 11/2018 | Feng ................... | G06F 13/1663 |
| 2023/0196692 | A1 * | 6/2023 | Madden ................ | G06V 20/20 345/419 |

OTHER PUBLICATIONS

Combined Search and Examination Report dated Nov. 15, 2021, GB Patent Application No. GB2108235.9.

* cited by examiner

*Primary Examiner* — Abderrahim Merouan
(74) *Attorney, Agent, or Firm* — Pearl Cohen Zedek Latzer Baratz LLP

(57) ABSTRACT

When storing data of an array of data in memory in a graphics processing system, respective memory regions are allocated for storing blocks of the data array, with the allocated region of memory for a block of the data array corresponding to a maximum possible size of the block of the data array when compressed, and being divided into a plurality of memory allocation sub-blocks, having at least one sub-block having a first, larger size and at least one sub-block having a second, smaller size. Blocks of the data array are compressed using a compression scheme, with each compressed block being stored in one or more of the sub-blocks of its allocated memory region.

21 Claims, 9 Drawing Sheets

| Memory address offset range | Sub-blocks | Cache lines | Memory channel striping granules |
|---|---|---|---|
| 1024:1279 | CU1 – 256 bytes | | |
| 768:1023 | CU1 – 256 bytes | CU1 bytes 192:255<br>CU1 bytes 128:191<br>CU1 bytes 64:127<br>CU1 bytes 0:63 | ←38 |
| 640:767 | CU1 – 128 bytes | CU1 bytes 320:383<br>CU1 bytes 256:319 | ←39 |
| 512:639 | CU0 – 128 bytes | CU0 bytes 256:319 | ←37 |
| 256:511 | CU0 – 256 bytes | | |
| 0:255 | CU0 – 256 bytes | CU0 bytes 192:255<br>CU0 bytes 128:191<br>CU0 bytes 64:127<br>CU0 bytes 0:63 | ←36 |

FIG. 3

| Memory address offset range | Sub-blocks | Cache lines | Memory channel striping granules |
|---|---|---|---|
| 576..767 | CU3 – 192 bytes | CU3 bytes 128..191 | |
| | | CU3 bytes 64..127 | |
| | | CU3 bytes 0..63 | |
| 384..575 | CU2 – 64 bytes | | |
| | CU2 – 128 bytes | CU2 bytes 64..127 | |
| | | CU2 bytes 0..63 | |
| 192..383 | CU1 – 128 bytes | CU1 bytes 64..127 | |
| | | CU1 bytes 0..63 | |
| | CU1 – 64 bytes | CU1 bytes 128..191 | |
| 0..191 | CU0 – 192 bytes | | |
| | | CU0 bytes 0..63 | |

FIG. 5

| Memory address offset range | Sub-blocks | Data stored | Cache lines |
|---|---|---|---|
| 128..191 | CU1 – 64 bytes | CU2 – bytes 0..63 | Cache line 2, bytes 128..191 |
| 96..127 | CU1 – 32 bytes | CU1 – bytes 64..95 | Cache line 1, bytes 64..127 |
| 64..95 | CU0 – 32 bytes | CU0 – bytes 0..32 | |
| 0..63 | CU0 – 64 bytes | | Cache line 0, bytes 0..63 |

FIG. 6

| Memory address offset range | Sub-blocks | Data stored | Cache lines |
|---|---|---|---|
| 144..191 | CU3 – 48 bytes | CU3 – bytes 0..47 | Cache line 2, bytes 128..191 |
| 96..143 | CU2 – 16 bytes | | Cache line 1, bytes 64..127 |
| | CU2 – 32 bytes | CU2 – bytes 0..31 | |
| 48..95 | CU1 – 32 bytes | CU1 – bytes 0..31 | |
| | CU1 – 16 bytes | CU1 – bytes 32..47 | Cache line 0, bytes 0..63 |
| 0..47 | CU0 – 48 bytes | CU0 – bytes 0..48 | |

FIG. 7

METHODS OF AND APPARATUS FOR STORING DATA IN MEMORY IN GRAPHICS PROCESSING SYSTEMS

CROSS-REFERENCE TO RELATED APPLICATIONS

This application claims priority pursuant to 35 U.S.C. 119(a) to United Kingdom Patent Application No. 2108235.9, filed Jun. 9, 2021, which application is incorporated herein by reference in its entirety.

BACKGROUND

The technology described herein relates to a method of and apparatus for storing data in memory in graphics processing systems, and in particular to such a method and apparatus for use to store frames (the frame buffer) and textures in a computer graphics processing system, or in another example to store machine learning feature maps when the graphics processing system is being used for machine learning processing.

Frames (images to be displayed) and textures in graphics processing systems will typically comprise a large array of data elements (e.g. each corresponding to respective sampling position or pixel in the image that they represent). Storing and accessing the frame buffer and textures can correspondingly have high storage and bandwidth requirements. This is particularly significant for mobile and handheld devices that perform graphics processing, as such devices may be inherently limited in their, e.g., storage, bandwidth and power resources and capabilities.

It is common therefore to store frames (the frame buffer) and textures in a "compressed" form, so as to try to reduce, e.g., the storage and bandwidth burden relating thereto.

A consideration when storing frames and textures in graphics processing systems is that there will usually be a need to access the stored data in a random access fashion (as it may not be known in advance which part or parts of the frame buffer or of a texture will be required at any particular time). This places a further constraint on the storage of the data, as it is accordingly desirable to be able to store the data in a manner that is suitable for (and efficient for) random access to the stored data. This problem can be exacerbated where the size of the stored data in memory can vary, e.g. because the compression rate applied to the data is variable (e.g. as can typically be the case when using lossless compression).

A further consideration when storing frames and textures is any constraints that may be imposed by the storage (memory) system that is being used to store the data. For example, many memory systems have a minimum efficient "memory transaction" size, which is the minimum amount of data that may be efficiently written or read in a single memory access transaction. For example, in the case of typical DRAM, there may be a standard, minimum, (efficient) memory transaction size of 64 bytes.

It is also known to provide plural, e.g. two, independent channels for accessing memory, with the address space then being interleaved across the plural, e.g. two, channels to benefit from the combined bandwidth made available from the plural channels. In this case, respective chunks (ranges) of the memory address space will be allocated to the different memory channels, in an alternating fashion. For example, every other 256 byte address chunk could be allocated to a different channel (these may be referred to as memory channel "striping granules"). In this case, it is desirable that any given memory access should not cross a channel (interleaving) boundary (as that would then require the access to be divided into two different transactions, one for each channel). This therefore defines a maximum (efficient) memory transaction size.

Similar considerations apply when storing machine learning feature maps, when the graphics processing system is being used to perform machine learning operations. For instance, a machine learning feature map may also comprise a multi-dimensional array of data that can be compressed in blocks, and wherein random access is required.

The Applicants believe that there remains a need for more efficient arrangements for storing such data in memory.

BRIEF DESCRIPTION OF THE DRAWINGS

A number of embodiments of the technology described herein will now be described by way of example only and with reference to the accompanying drawings, in which:

FIGS. 3, 4, 5, 6 and 7 show memory allocation layouts in embodiments of the technology described herein;

Like reference numerals are used for like elements and features in the Figures, where appropriate.

DETAILED DESCRIPTION

Figure 1:
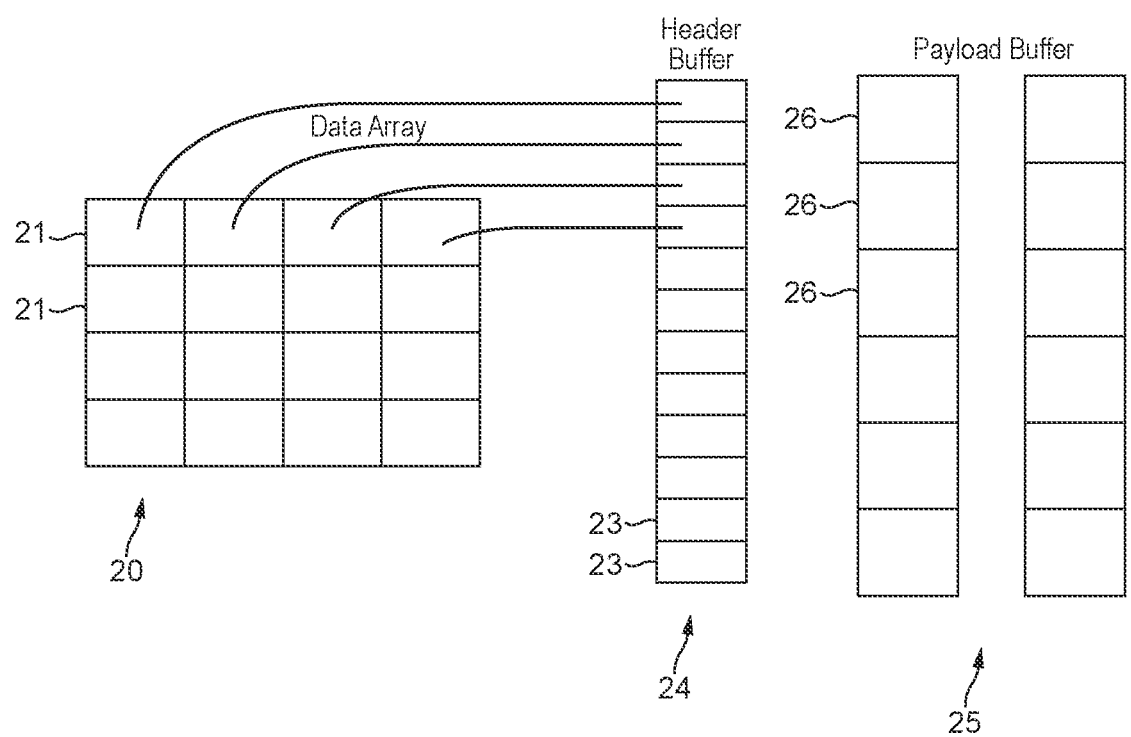
FIG. 1 shows schematically the storing of an array of data in accordance with an embodiment of the technology described herein.

A first embodiment of the technology described herein comprises a method of storing data of an array of data in memory in a graphics processing system, in which respective blocks of the data array are compressed using a compression scheme and stored in memory once compressed, the method comprising:

for a block of the data array, allocating a region of memory for storing the block, the allocated region of memory corresponding to a maximum possible size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum possible size of the block of the data array when compressed using the compression scheme;

compressing the block of the data array using the compression scheme;

and storing the compressed block of the data array in one or more of the sub-blocks of its allocated memory region.

A second embodiment of the technology described herein comprises an apparatus for storing data of an array of data in memory in a graphics processing system, the apparatus comprising:

a data encoder configured to:
  compress respective blocks of a data array using a compression scheme; and
  store blocks of a data array in memory once compressed;
and
a memory allocation circuit configured to:
  allocate, for a block of a data array to be compressed and stored, a region of memory for storing the block, the allocated region of memory corresponding to a maximum possible size of the block of the data array when compressed using the compression scheme, and being divided into a plurality of memory allocation sub-blocks, comprising at least one sub-block having a first larger size and at least one sub-block having a second, smaller size, the sub-blocks for the allocation together providing a memory allocation corresponding to the maximum possible size of the block of the data array when compressed using the compression scheme;
  wherein the data encoder is configured to, when it has compressed a block of a data array using the compression scheme, store the compressed block of the data array in one or more of the sub-blocks of its allocated memory region.

In the technology described herein, data of an array of data (which may be, and is in an embodiment, as discussed above, a frame buffer or a texture) is stored in memory in a graphics processing system by compressing and storing a block of the data array. (As will be discussed further below, in an embodiment the data array is divided into plural blocks, each of which are compressed and stored separately in the manner of the technology described herein.)

Furthermore, in the technology described herein, the (and in an embodiment each) block of the array is allocated a respective region of memory for storing the compressed data corresponding to the block, which region of memory is further sub-divided into plural memory allocation sub-blocks. The compressed block of the data array is then stored in one or more of the sub-blocks of the allocated memory region for the block. (As will be discussed further below, the region of memory allocated for storing a block may be a contiguous region of memory, or may be a "distributed" region of memory made up of plural, non-contiguous, sub-regions.)

As will be discussed further below, the Applicants have recognised that storing compressed blocks of data for an array of data in this manner can provide a more efficient way of storing and accessing such data and that can be made, for example, and in an embodiment, compatible with any need to facilitate random access to the data array, and also provide more efficient memory access given any constraints on accessing the memory imposed by the memory system itself (as discussed above).

For example, storing the data array as respective blocks in the memory facilitates random access to the array, as the stored data can effectively be accessed randomly at the block level (i.e. random access is available to the individual blocks that the data array is divided into).

The use of different sized sub-blocks within the memory region allocated to a given block of the data array facilitates, as will be discussed further below, storing the compressed data for a block in a manner that is more optimised for any minimum efficient memory transaction constraint of the memory system, and also for any memory system channel alignment (interleaving) boundaries. In particular, it can facilitate both reducing the number of required transactions and making any such transactions as long as possible, and reducing or avoiding transactions crossing memory channel "boundaries", even in the case where the sizes of the compressed blocks can vary from block-to-block (as will typically be the case where a variable rate compression scheme (e.g. a lossless compression scheme) is being used).

This can all help to reduce bandwidth and power on a system level. The data array that is to be stored in the technology described herein can be any suitable data array that is used and/or produced (generated) in graphics processing. It should, and in an embodiment does, comprise a plurality of data elements (entries), each occupying a different position in the array. The array may have any desired number of dimensions. In an embodiment the array has two dimensions. The data array in an embodiment represents an image.

In one embodiment, the data array comprises a frame to be displayed. Thus, in an embodiment, the data array is a frame of data to be stored in a frame buffer, e.g. for display. In another embodiment, the data array is a graphics texture.

In an embodiment, the method and apparatus of the technology described herein is used both for storing textures and frames (for storing the frame buffer). In other embodiments, the array is a feature map for a machine learning (ML) process.

The data for each entry (data element) in the data array can take any suitable and desired form. This will depend, as will be appreciated by those skilled in the art, upon the nature of the data for the array and the format that the array data is in. In the case of a frame buffer (and also, typically, a texture), the data for each data entry in the array will comprise an appropriate set of colour values, e.g. appropriate RGB or RGBα values, or luminance and chrominance values. Other arrangements would, of course, be possible.

The data array is processed and stored as respective blocks of the array. Thus although the technology described herein has been described so far primarily in relation to the operation in respect of a single block of the array being stored, in practice a data array to be stored will be divided into plural blocks (in an embodiment encompassing the entire array), with each such block then being handled in the manner of the technology described herein.

Thus, in an embodiment, the method of the technology described herein comprises (and the apparatus is correspondingly configured to):
  dividing an array of data to be stored into a plurality of blocks;
  for each block of the plurality of blocks, allocating a region of memory for storing the block, the allocated region of memory corresponding to a maximum possible size of the block of the data array when compressed (using the compression scheme in question), and being divided into a plurality of memory allocation sub-blocks, comprising at least one sub-block having a first, larger size and at least one sub-block having a second, smaller size, the sub-blocks for the allocation together providing a memory allocation corresponding to the maximum possible size of the block of the data array when compressed;
  for one or more, and in an embodiment for plural, and in an embodiment for each, block of the plurality of blocks of the data array:
  compressing the block using a compression scheme;
  and storing the compressed block of the data array in one or more of the sub-blocks of its allocated memory region.

The block(s) that a data array is divided for the purposes of the technology described herein into can take any suitable and desired form. Each block should, and in an embodiment does, comprise a subset of the data elements (positions) in the array, i.e. corresponding to a particular region (e.g. area) of the array. In an embodiment, the array is divided into (non-overlapping) regularly sized and shaped blocks (i.e. each block in an embodiment has the same size and configuration), such as and in an embodiment, rectangular blocks and in an embodiment square blocks (in the case of two-dimensional arrays).

The apparatus and method in an embodiment supports a plurality of different block sizes and configurations. For example blocks of 32, 64, 128, 256, 512 and/or 1024 data elements may be supported, and exemplary block configurations of: 8×8, 16×4, 16×16, 32×8, 64×4 and/or 128×2, etc., array positions (entries)). Thus, in the case of a frame buffer, for example, each block may correspond to (e.g.) 16×16 (or 8×8, 16×4, 32×8, 64×4, 128×2) positions (e.g. pixels) of the frame. Correspondingly, in the case of a texture map, for example, each block may in an embodiment correspond to 16×16 (or 8×8, 16×4, 32×8, 64×4, 128×2) texels.

Other arrangements would, of course, be possible. For instance, any suitable, supported block sizes may be used.

In an embodiment, the blocks correspond to a block size that will otherwise be used in the graphics processor and graphics processing system in question. Thus, in the case of a tile based graphics processor, the blocks in an embodiment correspond to (have the same size and configuration as) the tiles that the rendering process of the graphics processor is operating on.

In the technology described herein, a block of a data array to be stored in memory is allocated a region of memory for storing the block that corresponds to the maximum possible size of the block of the data array when compressed using the compression scheme in question. In other words, a region of memory corresponding to the maximum size that may be required for storing the block is allocated for storing the block. This facilitates random access to the individual blocks of the data array when stored, as it ensures that each block will be able to be stored in its entirety in its allocated region of memory (and independently of any other blocks).

As will be discussed further below, the region of memory allocated for storing a block may be a contiguous region of memory, or may be a "distributed" region of memory made up of plural, non-contiguous, sub-regions.

This should be and is in an embodiment, done for each block that the data array is divided into, i.e. such that there will be as many allocated memory regions as the number of blocks that the data array has been divided into.

Correspondingly, at least in the case where a data array is divided into plural blocks of the same shape and configuration when being stored in the manner of the technology described herein, and in an embodiment, each block for the data array is allocated the same amount of memory (the same size memory region) for its storage.

The size in the region of memory that is allocated for storing a (and each) block of a data array will depend upon, and be based upon, the maximum possible size of the block when compressed (using the compression scheme in question). This will depend on the compression scheme that is to be/being used.

For instance, for (variable rate) lossless compression, the size of the region of memory that is allocated for storing a (and each) block of a data array will depend upon, and be based upon, the "uncompressed" format of the data array (i.e. the (uncompressed) format used for the data elements of the data array) and the size of the block (in terms of the number of data elements in the block) (as the compression scheme will default to storing a block "uncompressed" if the compression results in a size that is larger than that).

Thus, in embodiments, for a block of the data array, the region of memory allocated for storing the block corresponds to the size of the block of the data array when uncompressed. For example, for a block of 256 pixels (16×16 pixels) of R10G10B10A10 format, the uncompressed (maximum) size will be 640 bytes. For this block size and format therefore, the memory allocation for storing the block (and for each block of the data array) would be 640 bytes. As another example, for a block of 128 pixels of R10G10B10A10 format, the uncompressed (maximum) size will be 320 bytes, and the memory allocation can be set accordingly. Other examples would be R8G8B8 with 128 pixels (384 bytes) or R8G8B8 with 64 pixels (192 bytes), with again the memory allocation set accordingly based on the uncompressed (maximum) size.

For other, e.g. lossy, variable rate compression schemes, the maximum possible size of the block when compressed may be specified, e.g. such that the compression scheme encodes to a fixed (maximum) size. For instance, a variable rate lossy compression scheme may attempt to compress a block losslessly to a smaller size than the maximum specified size, but if this fails, lossy compression is then applied to ensure that the compressed data size meets the maximum size requirement. In that case, the maximum possible size is specified by the lossy compression scheme, and is typically smaller than the uncompressed size.

The memory allocation for a (and each) block of a data array is divided into a plurality of memory allocation sub-blocks, comprising at least one sub-block having a first, larger size and at least one sub-block having a second, smaller size.

It would in this regard be possible for the allocation to also comprise one or more sub-blocks having a third size (which is different to the first and second sizes), and so on (e.g. also one or more sub-blocks having a fourth size, etc.), if desired. However, in an embodiment, the memory allocation is divided into sub-blocks of two different sizes only, i.e. one or more sub-blocks having a first, larger size, and one or more sub-blocks having a second, smaller size.

Thus, in an embodiment, there are two sizes of sub-block that are used for a memory allocation for a (and each) block of a data array, but in other embodiments there could be three (or more than three) different sizes of sub-blocks, if desired.

In one embodiment, the sub-block configuration is the same for all the blocks of the data array in question. In other words, the memory allocation for each block of a given data array will have the same sub-block configuration (be divided into the same set of different sized sub-blocks) (and be the same overall size).

In other embodiments, different sub-block configurations are used for different blocks of the data array in question. In this case, in an embodiment, some blocks of the data array use one particular sub-block configuration, and other sub-blocks of the data array use a different sub-block configuration. The particular sub-block configuration used for a block is in an embodiment dependent upon the position (index) of the block in the sequence of blocks in question (e.g. for all or part of the data array) and/or on any memory address offset that will be used for a block's memory allocation (e.g., and in an embodiment, in relation to a minimum efficient and/or maximum efficient memory transaction boundary).

In this case, in an embodiment, one set of blocks of the data array (e.g. having particular index values and/or offsets) has a sub-block configuration in the manner of the technology described herein, i.e. comprising at least one larger sub-block and one smaller sub-block. The other configuration that is then used for blocks of the data array in an embodiment comprises memory allocations that comprise only one (a single) (in an embodiment contiguous) sub-block, comprising the entirety of the memory region (memory allocation) for the block. Thus in this case, for a given data array, there will be some sub-blocks that are stored in the manner of the technology described herein, and other blocks of the data array that are stored as single contiguous sub-blocks comprising the entire memory allocation for the block. This may particularly be the case where the memory allocation for a block will fit within the entirety of a memory channel "stripe".

In an embodiment this arrangement is used for some maximum compressed block sizes, but other maximum compressed block sizes use the same sub-block configuration (in the manner of the technology described herein) for all blocks of the data array.

In an embodiment, the same sub-block configuration or configurations is used for all blocks having the same maximum compressed size. In other words, a given maximum compressed block size will always have the same sub-block configuration or configurations. Thus a data array that is divided into blocks having the maximum compressed size in question will use the same sub-block configuration or configurations as any other data array that is divided into blocks having that same maximum compressed size.

In an embodiment there is a plurality of particular, in an embodiment selected, in an embodiment predefined, maximum compressed block sizes that the system uses and supports, with each such permitted maximum compressed block size having its own corresponding particular, in an embodiment predefined, sub-block configuration or configurations that is used whenever that block size is being used. For example, and in an embodiment, the system may support maximum compressed block sizes of one or more of, and in an embodiment plural of, and in an embodiment all of: 48, 96, 192, 320, 384 and 640 bytes, with each respective block size then having its own corresponding sub-block configuration or configurations that is used whenever a block of that size is to be compressed and stored.

It will be appreciated that the system can also, and in an embodiment does also, use and support other block sizes that need not be, and in an embodiment that are not, handled in the specific manner of the technology described herein, such as block sizes that are powers of two, e.g. 32, 64, 128, 256, 512 and 1024 byte blocks. Such block sizes would already be aligned with the memory transaction boundaries, and so need not be handled in the specific manner of the technology described herein. Other arrangements would, of course, be possible.

The sub-block configuration (distribution) for a given memory allocation size can be any suitable and desired configuration that achieves the desired memory allocation size. This will, and in an embodiment does, depend upon the size of the memory allocation (i.e. the maximum memory size that the block could require) and the respective sizes of the sub-blocks.

In one embodiment, at least for some maximum compressed block sizes, the memory allocation is divided into one (and only one) (a single) sub-block having the first, larger size, and one (and only one) sub-block having the second, smaller size, i.e. such that the memory allocation will comprise two sub-blocks only, one larger size and one smaller size sub-block.

In other embodiments, at least for some maximum compressed block sizes, there is more than one sub-block of a particular size. In this case, there is in an embodiment a single sub-block of one size, and then plural (e.g., and in an embodiment, two) sub-blocks of the other size. In this case, there are in an embodiment plural, e.g. two, larger size sub-blocks, and only a single smaller size sub-block.

The sizes of the respective sub-blocks used for a memory allocation can be selected and determined in any suitable and desired manner. The larger sub-block size of a memory allocation is in an embodiment an integer multiple of the smaller size sub-block for the memory allocation. There is in an embodiment a power of 2 relationship between the sizes of the sub-blocks. In an embodiment, each first, larger size sub-block is twice or four times the size of the second, smaller size sub-block(s).

The sizes of the sub-blocks should be, and are in an embodiment, based at least on the memory allocation size that they make up (since the sum total of the sub-blocks should, and in an embodiment does, equal the overall memory allocation in question).

The sizes of the sub-blocks are in an embodiment also based on the minimum (efficient) memory transaction size supported by the graphics processor and graphics processing system in question, and any maximum (efficient) transaction size that avoids crossing memory channel boundaries. For ease of explanation these will be referred to herein as minimum/maximum transaction sizes. However, it will be appreciated that these may not be strict limits but are rather the minimum/maximum transaction sizes that can be efficiently handled by the graphics processor and graphics processing system in question.

In an embodiment, where the maximum compressed size of the block of the data array is greater than the maximum memory transaction size that avoids crossing memory channel "stripe" boundaries (i.e. the maximum size of transaction that will fit within a single memory channel "stripe"), then the memory allocation for a data block is divided into at least one sub-block having a size corresponding to the maximum transaction size (the memory channel striping size (granularity), and at least one sub-block having a size that is smaller than the maximum efficient transaction size (the memory channel striping width). In this case (and otherwise), the smaller sized sub-block or blocks is in an embodiment equal to the minimum transaction size or an integer multiple of that minimum transaction size.

Thus, in an embodiment, where the minimum (efficient) memory transaction size is m, e.g. 64, bytes, and the maximum transaction size to avoid crossing memory channel boundaries (the memory channel striping (interleaving) granularity) is n, e.g. 256, bytes, for blocks of a data array that have a maximum possible compressed size larger than n (e.g. 256) bytes, the memory allocation for a block will be divided into at least one sub-block having a size of n (e.g., 256) bytes, and at least one smaller sub-block having a size of either m, or 2m, e.g. 64 or 128, bytes.

In the case where the maximum compressed size of a block of the data array is less than the largest (efficient) transaction size (the memory channel striping granularity) supported by the graphics processing system, then the larger sub-block size is in an embodiment the size of the minimum transaction size, an integer multiple of that minimum transaction size, or a power of 2 fraction of that minimum transaction size, and/or a power of 2 fraction of the largest transaction size (the memory channel striping size), with the smaller sub-block size then being a power of 2 fraction, and in an embodiment a half, of the larger sub-block size.

Thus, in an embodiment, where the minimum memory transaction size is m, e.g. 64, bytes, and the maximum transaction size to avoid crossing memory channel striping boundaries (the memory channel striping (interleaving) size) is n, e.g. 256, bytes, for blocks of a data array that have a maximum compressed size smaller than n (e.g. 256) bytes, the memory allocation for a block will be divided into at least one larger sub-block having a size of n/2, n/4, or n/8, e.g. 128, 64 or 32, bytes, and at least one smaller sub-block having a size of m, m/2, or m/4, e.g. 64, 32 or 16 bytes.

Other arrangements would, of course, be possible. In one embodiment, the memory allocation for a block of the data array comprises a contiguous set of memory addresses. In this case therefore, each sub-block making up the allocation for a block of data will be arranged at contiguous memory addresses. Thus, in embodiments, the region of memory that is allocated for storing a block of data is a contiguous region of memory.

However, this is not essential, and in other embodiments, the respective sub-blocks making up the memory allocation (and memory region) for a block of a data array are not contiguous with each other (i.e. are not at contiguous memory addresses, but are separated in the memory address space from each other).

Thus, in general, the region of memory that is allocated for storing a block of data may comprise a number of sub-regions, which may or may not be contiguous with one another (in the memory address space). Various arrangements would be possible in this regard.

In an embodiment, all the memory allocations for the blocks for a given data array occupy a contiguous sequence (range) of memory address (although as discussed above, the individual blocks may be allocated non-contiguous addresses within that address range). However, it would also be possible for the memory allocations for at least some blocks for a data array to be separated from each other (for the memory allocations for the blocks for a data array to not (to other than) occupy a contiguous sequence (range) of memory addresses), if desired.

The order of the larger and smaller size blocks in memory for the blocks of a data array (their order (in the memory address space) in the memory allocation for a block) could be the same for each block of the data array (e.g. with the larger sized block or blocks always being before the smaller sized block or blocks (or vice versa) (and in one embodiment that is the case)).

For example, there could be a (in an embodiment contiguous) sequence of larger sized blocks for a respective set of plural, e.g. 4, blocks of the data array, followed (in the memory address space) by a (in an embodiment contiguous) sequence of smaller size sub-blocks for that set of plural, e.g. 4, blocks of the data array, with this pattern being repeated for subsequent sets of plural blocks of the data array (i.e. followed by a set of larger sub-blocks for a next set, e.g. 4, of blocks for the data array, followed by a set of smaller size sub-blocks for that next set of blocks of the data array, and so on) (and in one embodiment this is the case). This is preferred where the larger sub-block is four times the size of the smaller sub-block.

However, the order of the larger and smaller size blocks in memory for the blocks of a data array can, and in other embodiments does, differ for different blocks of the data array. For example, and in one embodiment, each even numbered block of data of the data array may have a larger sub-block before the smaller sub-block, but with each odd numbered block having its smaller sub-block before its larger sub-block (or vice-versa) (in the memory address space). This is preferred where the larger sub-block is twice the size of the smaller sub-block.

Thus, in one embodiment, the order of the larger and smaller sub-blocks varies for different blocks of the data array, and in an embodiment alternates for successive blocks of the data array that are being stored. In an embodiment, there is a larger sub-block followed by a smaller sub-block for a first block of the data array, followed by a smaller sub-block and then a larger sub-block for a second block of the data array, followed by a larger sub-block and a smaller sub-block for a third block of the data array, followed by a smaller sub-block and a larger sub-block for a fourth block of the data array, and so on (or vice-versa).

A given sub-block of the memory allocation for a block of a data array should, and in an embodiment does, comprise a contiguous sequence of memory addresses (a contiguous memory address range) (although as discussed above, respective sub-blocks for the memory allocation (region) for a given block of a data array may not necessarily be contiguous with each other in the memory address space). Thus each sub-block for a memory allocation for a block of a data array will occupy a contiguous range of addresses.

In an embodiment, the address ranges used for the sub-blocks for respective blocks of a data array are set so as to be compatible with any memory access constraints of the system in question. Thus, the address ranges used for the sub-blocks are in an embodiment appropriately aligned with any minimum (efficient) memory transaction size boundaries, and, correspondingly, with any maximum (efficient) memory transaction size (memory channel striping (interleaving)) boundaries.

Thus, in an embodiment, the address ranges that are used for respective sub-blocks for respective blocks of a data array are based on, and set in dependence on, the maximum memory transaction size that will not cross a memory channel boundary, and, in an embodiment, so as to be aligned with any memory channel boundaries, such that a memory transaction for a sub-block will not cross a memory channel boundary.

Thus, in an embodiment, where a sub-block size corresponds to the maximum memory transaction size that will not cross a channel striping boundary (the memory channel striping (interleaving) size), then the (and each such) sub-block is allocated a set of memory addresses that are aligned with the memory addresses for a complete "channel" transaction (i.e. so as not to cross a memory channel striping boundary).

Correspondingly, in the case where the memory allocation sub-block size is smaller than the memory channel striping size (granularity), then in an embodiment plural whole such sub-blocks, for the same and/or different blocks of the data array, are allocated entirely within a memory address space that will fall within the same memory channel transaction, such that, in effect, the address space for a single memory channel transaction will comprise (complete (and only complete)) plural such sub-blocks, e.g., and in an embodiment, from each of plural different blocks of the data array.

For example, where sub-blocks having half the size of the memory channel striping size are being used, then two such sub-blocks from two different blocks of the data array are in an embodiment allocated within the same memory channel address range. Correspondingly, where sub-blocks one quarter of the size of the memory channel address striping granularity are being used, then four such sub-blocks, in an embodiment from four different blocks of the data array, are in an embodiment arranged across the address width for a memory channel.

Thus, in an embodiment, the memory allocations for an integer number of blocks of a data array are in an embodiment correspondingly assigned to an integer number of memory channels (the address ranges for an integer number of memory channels). For example, where each block of the data array has a memory allocation essentially corresponding to one and a half memory channels, then the memory allocations for two blocks of the data array in an embodiment "occupy" three memory channels. Correspondingly, where the allocation for each block of a data array essentially occupies one and one quarter memory channels, four blocks of the data array are in an embodiment allocated across five memory channels. Other arrangements would, of course, be possible.

In this case, the "memory channel" address allocations for a set of plural blocks are in one embodiment contiguous. In another embodiment, they are not contiguous.

As discussed above, in an embodiment, the memory address ranges for the sub-blocks making up the memory allocation for a block of a data array are set and selected such that a sub-block will not cross (straddle) a memory channel address boundary.

Correspondingly, in an embodiment, the memory address ranges for the sub-blocks making up the memory allocation for a block of the data array are set and selected such that the sub-block will (entirely) occupy an integer number of the minimum (efficient) size memory access transactions that the system supports (i.e. such that the sub-block address range does not only partially fill (occupy) a minimum size memory access transaction of the system).

In order to achieve this, the memory address ranges used for sub-blocks of the memory allocations for blocks of a data array are in an embodiment appropriately aligned with any memory channel (stripe) address boundaries, and/or also with any minimum (efficient) size memory access transaction boundaries within a given memory channel.

For example, where appropriate, the start of a sub-block is in an embodiment aligned with the first address for a memory channel (stripe), and in any event, the start of a sub-block is aligned with the start of a minimum size memory access transaction boundary within a given memory channel (stripe).

Such alignment of the address ranges used for the sub-blocks with the memory channel address configuration and the minimum memory access transaction size can be achieved in any suitable and desired manner.

In an embodiment, this is achieved by starting each memory allocation and/or sub-block at a respective offset from a base address (which represents a base address for storing the data array), which offset is configured so as to align the memory address range for the memory allocation and/or sub-block with any memory channel (stripe) and/or minimum memory access transaction boundaries.

In an embodiment, the offset for a memory allocation and/or sub-block is based on an index for the block of the data array and the address width for a memory channel (stripe) and/or the size of the minimum memory access transaction for the system in question.

Thus, in an embodiment blocks of the data array are indexed (in an embodiment starting from 0) in a particular sequence order (e.g. based on a raster order or Morton order or any other suitable order of the blocks). In this case, the indexing could be across the entire data array, or could be for and within a respective sub-set of the blocks of the overall data array. For example, where respective subsets of blocks are stored together in a defined "coding container" having a given start address within the buffer that stores the overall data array, the blocks may be, and are in an embodiment, indexed within their respective subsets of blocks.

In these cases, the memory (address) offset from a base address for the data array (or from a base address for a "coding container" within the buffer storing the data array) for the memory allocation and/or for the memory allocation sub-blocks for a given block is in an embodiment then determined, at least in part, based on the block index (either within the data array as a whole or within a respective subset of blocks of the data array), and in an embodiment also a (set) (per-block or per-sub-block) memory address offset that is based on (e.g. that is equal to or equal to an integer multiple of and/or of a sum of) the address width for a memory channel (stripe) and/or the size of the minimum (efficient) memory access transaction for the system in question.

For example, where a sub-block has a size corresponding to the width of a memory channel stripe, then each such "full channel width" sub-block is in an embodiment stored at an offset based on the block index multiplied by the memory channel stripe width (or an integer multiple of the memory channel stripe width).

In the case of sub-blocks having a size that is smaller than the memory channel stripe width (granularity), then those sub-blocks are in an embodiment stored starting at a memory address within a given memory channel that aligns with the minimum memory transaction size (i.e. a memory address that is either the first address of the channel or at an offset from that start address that is an integer multiple of the minimum (efficient) memory transaction size).

Thus, for example, where the memory channel striping (interleaving) width (granularity) is 256 bytes and the minimum (efficient) memory transaction size is 64 bytes, sub-blocks that are smaller than 256 bytes will in an embodiment be stored starting at either byte 0, byte 64, byte 128, or byte 192 within the address width of a memory channel stripe.

Thus, for example, for 128 byte sub-blocks, one such sub-block will be stored starting at address 0 for the memory channel stripe address range in question, with the other 128 byte sub-block being stored starting at an offset of 128 within the address range. Correspondingly, for sub-blocks of a size of 64 bytes, one sub-block (e.g. for a first block of the data array) will be stored at address offset 0, a second sub-block (e.g. for a second block of the data array) will be stored at an address offset of 64 from the start of the memory channel stripe, a third sub-block (e.g. for a third block of the data array) will be stored at an address offset of 128 from the start of the memory channel, and a fourth sub-block (e.g. for a fourth block of the data array) will be stored at an address offset of 192 bytes from the start of the memory channel.

In this regard, the per-block or per-sub-block memory (address) offset that is used for the blocks of a data array could be the same for each block of the data array, or could differ for different blocks of the data array. For example, a first offset (to then be multiplied by the block index) could be used for even numbered blocks, with a different offset (again to then be multiplied by the block index) being used for odd numbered blocks. Other arrangements would, of course, be possible.

In an embodiment, the base address (e.g. start address) for storing a data array (the start address of the buffer where the compressed data array will be stored) is in an embodiment correspondingly set so as to align with any memory channel striping and/or minimum memory access transaction boundaries. In an embodiment the base (start) address for storing a data array is set to the start address for a given memory channel (stripe) address range. Thus the start of the buffer that is storing the compressed data array (the base address for storing the data array) is in an embodiment aligned on the memory channel striping boundaries (if any).

It will be appreciated from the above that in embodiments of the technology described herein at least, where the memory system has a minimum (efficient) memory access transaction size of $GR_A$, and a maximum transaction size that will not cross a memory channel striping boundary of $GB_B$, where $GR_B = n*GR_A$, then for a block of a data array having a maximum compressed size of $m*GR_A$, a memory allocation of size $m*GR_A$ will allocated to the block and split into one or more sub-blocks of size $GR_B$, and a single sub-block of size $k*GR_A$ (where k is smaller than n (i.e. such that the sub-block is smaller than $GR_B$)), with the sub-blocks of size $GR_B$ in an embodiment being aligned on $GR_B$ (and stored in a contiguous area or interleaved with other such sub-blocks), and the smaller sub-block of size $k*GR_A$ from several blocks of the data array in an embodiment being combined together to form a larger unit of memory that is aligned on $GR_B$. The smaller sub-blocks from the different blocks of the data array are in an embodiment each allocated a contiguous area, with the sub-blocks from the different blocks being packed densely.

Other arrangements would, of course, be possible. The operation in the manner of the technology described herein can be performed by any suitable and desired element(s), component(s), etc. of the system and/or processor in question. For example, an encoder (compression codec) that is performing the compression may be operable to determine the addresses that the data is to be stored at (e.g. based on a provided block index), e.g., within an overall memory buffer that has been allocated for the data array by software.

In the technology described herein, a block of a data array is compressed and then the compressed block is stored in one or more of the sub-blocks of the memory region allocated for the block.

The compression scheme that is used to compress the block(s) of the data array before they are stored can be any suitable and desired (block-based) compression scheme. It is in an embodiment a variable rate compression scheme (i.e. that is not constrained to always produce compressed blocks of the same size from a given size of input block (that is not a fixed rate compression scheme) and that is such that individual blocks of the data array can be accessed and used independently of other blocks of the data array).

The compression scheme may be lossless or lossy, as suitable and desired. The compression scheme may, for example, comprise one of the Applicant's previously proposed compression schemes, e.g. as described in US 2012/0281007, US 2013/0036290, or US 2013/0198485, the entire contents of which are hereby incorporated by reference.

The system and apparatus may support only a single compression scheme (that is then always used), or there may be a plurality of compression schemes available, with the compression scheme used for a given data array then being selected (and selectable) in use.

Once a block of the data has been compressed, the compressed version of the block is then stored in the memory allocation for the block. It will be appreciated in this regard that depending upon the size of the compressed block, either all or less than all of the sub-blocks of the memory region allocated to the block will be required to store the compressed block. Equally, different blocks of the data array may have different sizes when compressed (at least when a variable rate compression scheme is being used), and therefore different compressed blocks for a given data array may use different combinations of the sub-blocks of their respective memory allocations.

Thus in an embodiment, the method of the technology described herein comprises (and the encoder is correspondingly configured to) determining which sub-blocks of the memory region allocated to a block of the data array to use (in which) to store the compressed block of the data array.

In an embodiment, the sub-blocks to use for storing a compressed block are determined at least based on the size of the compressed block. In an embodiment, the compressed block is stored in only so many sub-blocks as are required to contain the compressed block (such that where, for example, the compressed block will fit entirely within the larger sub-block, the smaller sub-block is not used). The process in an embodiment also operates so as to entirely fill a sub-block before using (starting) another sub-block.

Thus, in an embodiment, the number of sub-blocks that are used for storing the compressed block is based on the size of the compressed block. As will be discussed further below, in an embodiment, the order in which the sub-blocks are used when storing a compressed block (and in particular whether a larger or smaller sub-block is used first when storing the compressed block), is also determined based on the size of the compressed block.

In an embodiment, the size of the compressed block is rounded up to the size of the smaller (smallest) sub-block of the memory allocation or to the minimum (efficient) memory transaction size (whichever is the smaller), and then the so-rounded up size is used as the size of the compressed block when determining which sub-block or sub-blocks of the memory allocation for the compressed block should be used for storing the compressed block (and how).

The particular sub-blocks of the allocated region for a block that the compressed block (the data for the compressed block) is stored in can be determined and selected in any suitable and desired manner.

In one embodiment, a (and each) compressed block is stored using a "largest" sub-block first policy, i.e. such that the compressed block will be stored in the largest sub-block or sub-blocks of the allocated memory region first, with the smaller sub-block or sub-blocks then only being used if required. In other words, the largest sub-blocks are used first, and the smaller sub-blocks are used only if the compressed block does not fit within the largest sub-blocks.

In this case therefore, if the compressed block will fit within a single larger sub-block of the memory allocation for the block of data, then only that single larger sub-block will be used, with any other larger sub-blocks and none of the smaller sub-blocks for the memory allocation being used to store the compressed block. Equally, if there is still data remaining for the compressed block once a larger sub-block has been filled, then either another larger sub-block (if any) will be used to store data for the block, or a smaller sub-block will be used to store data for the block (and so on where not all the data for the compressed block has been stored).

In this case, the sub-block order when storing the data for a (and each) compressed block will be the same irrespective of the size of the compressed block (and for all blocks of the array), i.e. irrespective of the size of the compressed block, the data for the compressed block will always be stored first at the beginning of the (or the first of the) larger sub-blocks for the allocation, and will be stored across the allocation starting from that first larger sub-block (as and if required).

In an embodiment, rather than simply always storing a compressed block starting in the largest sub-block of the allocation, a "best fit" approach is used, i.e. the best combination of larger and smaller sub-blocks for storing the compressed block (i.e. that fills the sub-blocks most efficiently (with the minimum spare space in any unfilled sub-block) is determined and used. This may then allow the blocks of the data array to be stored more efficiently (from a memory transaction point of view). In this case therefore, rather than simply always using the largest sub-block first, it will be determined whether a smaller sub-block only can be used to store the compressed block and only if that is not the case, will a larger sub-block be used.

Thus in an embodiment, when storing a compressed block of data in one or more of the sub-blocks of its allocated memory region, it is determined whether the compressed block of data will fit within a sub-block having the second, smaller size of the allocated memory region, and, if so, the compressed block of the data array is then stored in that smaller sub-block only, but when it is determined that the compressed block will not fit within a single smaller sub-block, the compressed block of the data array is stored starting with a larger sub-block of the memory allocation for the block of the data array.

In this case, if any further data for the compressed block remains to be stored after the larger sub-block has been used, then in an embodiment the process is repeated, i.e. to determine whether any remaining data for the compressed block can be stored in a smaller sub-block only (and if so storing it in a smaller sub-block), but if not, storing it in a larger sub-block (and so on for any remaining data until the entire compressed block has been stored across the sub-blocks of the allocated memory region for the block of the data array).

In this case, the sub-block order in which the data for a compressed block is stored in the sub-blocks of the memory region allocated for the block of the data array (and which sub-blocks are used) will depend on the size of the compressed data. In other words, the storage layout within the allocation for a block of the data array will depend upon the size of the compressed data for the block. Equally different blocks from the same data array may use a different sub-block order, and/or different sub-blocks, to each other.

As the sub-blocks to use for storing a compressed block of a data array are determined, or once all the sub-blocks to use for storing a compressed block of a data array have been determined, then the compressed block (the data for the compressed block) should be stored in the determined sub-block(s) appropriately. This can be done in any suitable and desired manner, for example, and in an embodiment, in accordance with the normal manner for storing data in memory in the data processing system in question (i.e. using the appropriate memory write transactions, distributed within the appropriate memory channels, etc.).

It would be possible to determine all the sub-block(s) to be used first, and to then write out the compressed block to those sub-block(s), e.g. one after another (as required), or the process could determine a first sub-block to use only, write out to that sub-block, then determine if another sub-block is needed, and, if so, then determine the sub-block to use next and write out to that sub-block, and so on (as and if required).

Thus, in an embodiment, a first sub-block to use for a compressed block will be determined, the data for the compressed block written to that sub-block, and if there is any remaining data for the compressed block, a next sub-block to use for the compressed block determined, and data written to that next sub-block, and so on, as required.

Where smaller sub-blocks from plural different data blocks are able to be combined together within the address range for a given memory channel stripe, for example, then in an embodiment, the encoding process and encoder operates to combine plural sub-blocks from different blocks of the data array into a single, common write transaction that writes all of those sub-blocks in the same write transaction within the same memory channel stripe. This may be particularly applicable in the case where the encoder includes appropriate local storage such that it can buffer compressed block data (and in particular compressed block data to be written to respective sub-blocks from different blocks of the data array), so as to then be able to write those sub-blocks out to memory together in the same, single transaction.

Where data for a compressed block of a data array does not completely fill a sub-block of the memory allocation for that block, then although there is no need to "pad" any remaining space in the sub-block with "dummy" data, in an embodiment the data is "padded" to the minimum efficient write transaction size when storing the compressed block.

For any sub-block of the memory allocation for a block that is (completely) unused, then no data for the block will be stored in that sub-block (but the sub-block should still remain available and part of the memory allocation for the block (i.e. should not be used, e.g., for storing data of other blocks (or otherwise)), as it may be that if there are changes to the block of the array, such that a changed version of the block needs to be stored, that the compressed version of the changed block will require more memory space, and so potentially use the previously "spare" sub-block or sub-blocks.

In an embodiment, each stored compressed data block also has (has generated and stored for it) an associated header that includes information to be used for retrieving the stored block from the memory.

There is in an embodiment a separate (and individually modifiable) header for each (stored) block of the array.

The headers for the stored compressed data blocks should be and are in an embodiment stored in suitable association with the stored compressed data blocks for the array. The headers can be stored in any suitable and desired manner and arrangement. In an embodiment, plural headers are stored together such that they occupy a memory channel "stripe". In an embodiment plural, e.g., all the, headers for a data array are stored together, in a "header buffer" for the data array. Other arrangements would, of course, be possible.

The header for a block in an embodiment includes at least an indication of the size of the data (e.g. in bytes) that has been stored for the compressed block in question. This will allow a decoder (for example) wishing to retrieve the stored block data to determine the location of the block data. Thus, in an embodiment, the headers include data indicating the size (in memory) of the data for some or all, and in an embodiment for each, of the stored compressed blocks of the data array.

Thus in an embodiment of the technology described herein, the method of the technology described herein further comprises (and the encoder is correspondingly configured to) also generating and storing for a (and for each) compressed block of the data array, a header for the compressed block of the data array, which header includes an indication of the size of the data that has been stored for the compressed block.

The header could indicate the size of the data that has been stored for the compressed block simply in terms of the total amount of the data that has been stored for the compressed block. In an embodiment, the header indicates the size of each plural smaller sub-units of the compressed block (so as to facilitate random read access to sub-units within a compressed block), with the overall size of the compressed data block then being determined as the sum of all the sizes of the sub-units indicated in the header.

In one embodiment, the header for a data block does not store any indication (pointer or offset) of the location in memory where the data for the block is stored, with that location instead being determined, e.g. from an otherwise provided base memory address for the data array as a whole and, e.g., an index for the block in question. In this case, the header could include a flag that could be set to indicate a choice between two locations for the compressed data.

In an embodiment, the memory location of an individual sub-block is derived from a base memory address, e.g. for the data array or a part of the data array, by using an appropriate offset or offsets from that base memory address, which offset or offsets are in an embodiment based on the sub-block configuration being used, and/or an index for the block in question.

In other embodiments, the header for a data block also stores an indication of the location in memory where the data for the block is stored.

In this case, the indication of the location in memory of the data for the block of the data array that a header relates to can take any suitable and desired form. It could, for example, indicate directly the memory location (address) of the block data, or that could be indicated indirectly, e.g. as an offset from some other (known) memory location (address).

In these arrangements, the header could include separate pointer data for each respective sub-block of the memory allocation for the block of the data array, but in an embodiment the header includes pointer data to a base, e.g. start, location (a base, e.g. start, address) in memory for the memory allocation for the block of the data array, with the locations of the individual sub-blocks of the allocation then being derived from that base, e.g. start, memory location.

In an embodiment, the memory location of an individual sub-block is derived from the base "memory allocation" location by using an appropriate offset or offsets from that base location, which offset or offsets are in an embodiment based on the sub-block configuration being used, and/or an index for the block in question.

The header for a data block may also be used to store other information, if desired. For example, the header could be used to indicate "special case" blocks. For example, if all the data elements in the block have the same value, then the header may store a flag to indicate that and also the common data value.

In an embodiment, the system supports the use of two memory allocations for a block, and the header is then used to indicate which of the two allocations is currently being used for the block. This would allow the unused allocation to be updated with a new version of a block, with the header then being changed to indicate that new allocation, thereby reducing the risk of a read operation getting a mix of the old header and new compressed data.

Other arrangements for the headers would, of course, be possible. The operation in the manner of the technology described herein to compress and store a data array in the manner of the technology described herein can be triggered in any suitable and desired manner. This is in an embodiment done by providing an appropriate command (signal) to the encoding process (the encoder), together with appropriate parameters to cause the encoding and storing operation to be performed in the desired manner.

In an embodiment, encoding parameters and/or properties that the encoding process (the encoder) should use when compressing the uncompressed data array are conveyed to the encoding process and the encoder. For example, and in an embodiment, an indication of the encoding scheme to be used is conveyed to the encoding process and the encoder.

In an embodiment, parameters and/or properties of the uncompressed data array that is to be compressed and stored are also or instead, and in an embodiment also, indicated to the encoding process and the encoder. The indicated parameters and/or properties can be any suitable parameters or properties, such as data representation parameters and/or properties, such as the format of the data elements for the data array (e.g. whether they are RGB, RGBα, YUV, etc.), the number of components for the data array, the number of bits (per component) of the data array, whether the data is represented in floating point/unsigned/signed integer format, etc.

In an embodiment, at least the uncompressed format for the data array and the size of the blocks (e.g. in terms of the number of data elements in a block) to be encoded is conveyed to the encoder and the encoding process, as that will then allow the uncompressed size (in memory) of a block of the data array (and thus the size of the memory allocations to be used for the blocks of the data array) to be determined.

In an embodiment, a base location (memory address), in an embodiment a start memory address, at which the data array is to be stored is also conveyed to the encoder and the encoding process. The encoder and the encoding process in an embodiment then uses this base address for the data array to determine the memory addresses for each memory allocation (and the sub-blocks making up the memory allocation) for each block of the data array.

As discussed above, the memory locations (addresses) for the memory allocations (and for the individual sub-blocks within those allocations) for given blocks of the data array are in an embodiment derived from the indicated base "data array" memory address by using an appropriate offset or offsets from that base memory address, which offset or offsets are in an embodiment based on an index for the block in question (and the memory allocation size and sub-block configuration to be used for that memory allocation size).

In an embodiment, the encoder (and correspondingly the decoder) is provided with the following information to allow the location of the headers and the memory allocation sub-blocks to be determined: a base address for a "coding container" that stores the data block in question as well as its header (in this case, the overall storage of the data array is in an embodiment split into a plurality of "coding containers" that all have the same layout (within the same buffer) that each contain a number of data blocks as well as their headers); the index of the data block (within the coding container); the data element (e.g. pixel) format (e.g. RA8G8B8A8); and the necessary encoding parameters (e.g. the size of the uncompressed data block, whether the compression is lossy or lossless, etc.).

The relevant encoding information can be conveyed to the encoder and the encoding process in any suitable and desired manner. In an embodiment it is provided as part of metadata (such as a descriptor or descriptors) for the data array in question.

Other arrangements would, of course, be possible. It will be appreciated from the above that although in the technology described herein in general for a given data array, blocks of the data array will be allocated respective memory allocations comprising sub-blocks having different sizes, the actual configuration of the memory allocations and sub-blocks making up those allocations will differ depending upon the format of the data array and the size of the blocks (number of data elements per block) being encoded. Correspondingly, different configurations of memory allocations and sub-blocks may be used for different data arrays.

Thus there will be, and is in an embodiment, a plurality of different memory allocation and sub-block configurations that can be used, depending upon the format of the data array and the size of the blocks (number of data elements per block) to be stored.

Thus the encoder and encoding process of the technology described herein in an embodiment supports a plurality of different (predefined) memory allocation and sub-block configurations, and is able to, and operates to, select between those different configurations in dependence on the format of the data array and/or the size of the blocks to be stored. (As discussed above, in embodiments, the uncompressed format of the data array and the size of the blocks to be stored is conveyed to the encoder in the encoding process. The encoder and encoding process is correspondingly in an embodiment operable to select and use the appropriate memory allocation and sub-block configuration for the indicated uncompressed data array format and block size.)

Thus, in an embodiment, the encoder and the encoding process of the technology described herein supports a plurality of different (predefined) memory allocation and sub-block configurations, each associated with a respective different uncompressed data array format and block size, and operates to select (and then use) one of the defined memory allocation and sub-block configurations based on the uncompressed format of the data array and size of the block(s) that is to be compressed and stored.

Correspondingly, there may be data array formats where operation in the manner of the technology described herein is not needed (and correspondingly is in an embodiment not used), such as data arrays whose uncompressed format for the desired block size (number of data elements per block) aligns (fits) exactly with the minimum (efficient) memory transaction size and/or with the memory channel striping granularity that the system supports. For example, data array formats where respective blocks of the data array will have a maximum compressed size matching the memory channel striping width (or some integer multiple of that memory channel striping width) may simply be stored using allocations matching the appropriate number of memory channels, and so there is no need to use memory allocations having the particular configuration of the technology described herein for such data array formats.

Thus, in an embodiment, the technology described herein is not used for all data arrays that may fall to be stored, but is selectively used when storing data arrays, e.g., and in an embodiment, in dependence upon the format of the data array and the block size that is being stored. Correspondingly, the encoder is in an embodiment operable to and configured to selectively operate in the manner of the technology described herein when storing a data array, again in an embodiment in dependence upon the format of the data array and the block size that is being stored.

Although the technology described herein has been described above with particular reference to the storing of the data for the data array, as will be appreciated by those skilled in the art, the technology described herein also extends to the reading (and decompressing) of data of a data array that has been stored in the manner of the technology described herein.

Thus, in an embodiment, the method of the technology described herein further comprises (and the apparatus is correspondingly configured to), reading a stored compressed block of a data array from the memory, decompressing the stored block of the data array using the (variable rate) compression scheme, and providing the decompressed block of the data array for use (e.g. by storing it in suitable storage, such as memory or a cache, in its uncompressed form, providing it to a display for display, providing it to another processor for processing, etc.).

Correspondingly, an embodiment of the technology described herein comprises a method of providing an uncompressed version of a block of a data array from a compressed version of the block of the data array that has been compressed using a compression scheme and that has been stored in one or more sub-blocks of a region of memory allocated for storing the compressed block, the allocated region of memory corresponding to the maximum possible size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum possible size of the block of the data array when compressed using the compression scheme;

the method comprising:
    determining which sub-block or sub-blocks of the memory allocation for the block of the data array have been used to store the compressed block;
    reading the determined sub-block or sub-blocks from the memory to obtain the compressed block of the data array;
    decompressing the compressed block of the data array using the compression scheme; and
    providing the decompressed block of the data array for use.

Another embodiment of the technology described herein comprises an apparatus for providing an uncompressed version of a block of a data array from a compressed version of the block of the data array that has been compressed using a compression scheme and that has been stored in one or more sub-blocks of a region of memory allocated for storing the compressed block, the allocated region of memory corresponding to the maximum possible size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum possible size of the block of the data array when compressed using the compression scheme;

the apparatus comprising:
    a sub-block determining circuit configured to determine which sub-block or sub-blocks of a memory allocation for a block of a data array have been used to store the compressed block;
    a read circuit configured to read a determined sub-block or sub-blocks from memory to obtain a compressed block of a data array;
    a decoding circuit configured to decompress a compressed block of a data array using a compression scheme; and an output circuit configured to provide a decompressed block of a data array for use.

As will be appreciated by those skilled in the art, embodiments of the technology described herein can, and in an embodiment do, include one or more or all of the preferred and optional features of the technology described herein, as appropriate.

Thus, for example, and in an embodiment, the sub-blocks that have been used to store the compressed block are in an embodiment determined based on the size of the compressed block in the memory. In an embodiment, the size of the compressed block in the memory is used at least to determine how many sub-blocks of the memory allocation have been used to store the compressed block.

The size of the compressed block in the memory could simply be used to determine how many sub-blocks have been used to store the compressed block, with the sub-blocks always being read in a particular, in an embodiment selected, in an embodiment predetermined, order of the sub-blocks (up to the determined number of sub-blocks to be read) (and in one embodiment that is what is done). In this case, as discussed above, the decoding process will in an embodiment read a larger sub-block first, and only read further sub-blocks if the indicated size of the compressed block is larger than the largest first sub-block.

In other embodiments, the indicated size of the compressed block is also used to determine which sub-block to read first (i.e. rather than always reading the sub-blocks in a predetermined order) (i.e., and in an embodiment, whether to read a larger or a smaller sub-block first), and, where appropriate, which sub-block to read next, and so on, as required.

As discussed above, the size of the compressed block in the memory is in an embodiment conveyed to the decoder appropriately, for example, and in an embodiment, as part of a header associated with the compressed block. Thus the decoding process (and the decoder) will in an embodiment read a header associated with the compressed block and determine therefrom the size of the compressed data for the compressed block, and then use the indicated size of the compressed data to determine how many and which sub-blocks need to be read for the compressed block.

Thus, in an embodiment, the decoding process comprises (and the decoder is configured to):

reading a stored header for the compressed block of the data array, and determining therefrom the size of the stored compressed block of the data array;

using the indicated compressed size of the compressed block of the data array to determine the sub-block or sub-blocks of a memory allocation for the compressed block of the data array that the data for the compressed block is stored in;

reading the determined sub-block or sub-blocks from the memory;

decompressing the read data from the sub-blocks to generate an uncompressed version of the block of the data array; and providing the uncompressed version of the block of the data array for use.

It will be appreciated in this regard that the decoding process will only read as many sub-blocks as are necessary based on the indicated size of the compressed block. Any "empty" sub-blocks will not be read. Equally, in an embodiment, when decompressing the read compressed block, only the indicated data that is required from the sub-blocks is used for that decompression operation.

In an embodiment, the sub-blocks to read for a compressed data block are also determined based on the uncompressed format for the data array and the size of the block of the data array (in terms of how many data elements there are in the block). As discussed above, this information will set and allow to be determined the uncompressed size of the block, and accordingly therefore the size of the memory allocation and the sub-block configuration within that memory allocation (which the decoder and decoding process can then use, in an embodiment with the size of the compressed block, to determine which sub-blocks will have been used to store the compressed block).

Thus, in an embodiment, the sub-blocks to read for the compressed data block are determined based on the uncompressed format for the data array and the size of the block of the data array (i.e. how many data elements there are in the block), together with the size of the compressed block in the memory.

In an embodiment, the decoder and the decoding process also operates to and is configured to determine the memory address or addresses for the required sub-block or sub-blocks. This can be done in any suitable and desired manner. For example, the decoder and decoding process may be provided with a (direct) indication of the memory address, e.g. for the memory allocation for the compressed block of the data array.

In an embodiment, the memory addresses for the required sub-block or sub-blocks are based on a base memory address, e.g., for the data array as a whole, together with a memory offset or offsets that is determined based on an index (e.g. within the data array in question) for the block of the data array that is to be decompressed. In this case, the decoder and the decoding process in an embodiment uses the block index, together with a particular, in an embodiment selected, and in an embodiment predetermined, memory address offset or offsets (e.g., and in an embodiment, for the memory allocation size in question), to determine an offset from a base memory address where the required sub-block or sub-blocks will be stored (and will then proceed to read the sub-blocks from that determined address or addresses).

In this case, the required offset or offsets may be, and are in an embodiment, determined based on the uncompressed format of the data array and the size (in terms of the number of data elements) of the block of the data array (which as discussed above may be appropriately conveyed to the decoder and the decoding process (as that uncompressed format will then determine the size of the memory allocation and the configuration of sub-blocks that have been used for the block of the data array). The block index is in an embodiment conveyed appropriately to the decoder and the decoding process, e.g., and in an embodiment as part of or associated with the command that triggers the decoding operation.

Other arrangements would, of course, be possible. For example, the header for a block of the data array could also convey information that indicates, and/or that can be used to determine, the memory address of the memory allocation and/or of the individual sub-blocks of the memory allocation for the compressed block of the data array).

Once the sub-blocks that have been used for storing the compressed block of the data array (and their locations in memory) have been determined, then the sub-block or sub-blocks (the compressed block) (the data for the compressed block) is or are read from the memory. This can be done in any suitable and desired manner, for example, and in an embodiment, in accordance with the normal manner for reading data from memory in the data processing system in question (i.e. using the appropriate memory read transactions, distributed within the appropriate memory channels, etc.).

Once the sub-block or sub-blocks storing the compressed block have been determined and read, the compressed block is decompressed.

The compression scheme that is used to decompress the block of the data array will, and in an embodiment does, correspond to the compression scheme used to compress the block.

Again, the decoder and decoding process may support only a single compression scheme (that is then always used), or there may be a plurality of compression schemes available, with the compression scheme used for a given data array then being selected (and selectable) in use.

Once the block of the data array has been decompressed, then the decompressed block is provided for use. As discussed above, this may comprise, for example, storing it in suitable storage, such as a memory or cache, in its uncompressed form, providing it to a display for display, providing it to another processor for processing, etc. This can be done in the normal manner for the processor and system in question, and in accordance with the intended use of the data array.

Although the decoding and decoding process has been described above with particular reference to the processing in respect of a single compressed block of a data array, as will be appreciated by those skilled in the art, this process is in an embodiment repeated for plural blocks of a given data array, e.g. for all the blocks of a data array (where the data array in its entirety is required). However, it may be that only some but not all of the blocks of a data array are required, for example in the case of graphics textures, and thus it is not necessary that the entire data array is decompressed, except where that is required.

The operation to read and decompress a stored block of a data array in the manner of the technology described herein can be triggered in any suitable and desired manner. This is in an embodiment done by providing an appropriate command (signal) to the decoding process (the decoder), together with appropriate parameters to cause the reading and decoding operation to be performed in the desired manner. (The parameters that are provided to the decoding operation should be, and are in an embodiment, the same as, or at least correspond to, the parameters that were used for the encoding operation.)

In an embodiment at least an indication of the data array and of the block or blocks of the data array to be decoded (e.g., and in an embodiment, the index of the block or blocks) is provided to the decoding process and the decoder.

In an embodiment, decoding parameters and/or properties that the decoding process (the decoder) should use when decompressing the compressed block of the data array are conveyed to the decoding process and the decoder. For example, and in an embodiment, an indication of the decoding scheme to be used is conveyed to the decoding process and the decoder.

In an embodiment, parameters and/or properties of the uncompressed data array that has been compressed and stored are also or instead, and in an embodiment also, indicated to the decoding process and the decoder. The indicated parameters and/or properties can be any suitable parameters or properties, such as data representation parameters and/or properties, such as the format of the data elements for the data array (e.g. whether they are RGB, RGBα, YUV, etc.), the number of components for the data array, the number of bits (per component) of the data array, whether the data is represented in floating point/unsigned/signed integer format, etc.

In an embodiment, at least the uncompressed format for the data array and the size of the block (in terms of how many data elements it contains) to be decoded is conveyed to the decoder and the decoding process, as that will then allow the uncompressed size of the block of the data array (and thus the size of the memory allocation used for the block of the data array) to be determined.

In an embodiment, a base location (memory address), in an embodiment a start memory address, at which the data array is stored is also conveyed to the decoder and the decoding process. The decoder and the decoding process in an embodiment then uses this base address for the data array to determine the memory addresses for the memory allocation (and the sub-blocks making up the memory allocation) for the block of the data array.

As discussed above, the memory locations (addresses) for the memory allocations (and for the individual sub-blocks within those allocations) for given blocks of the data array are in an embodiment derived from the indicated base "data array" memory address by using an appropriate offset or offsets from that base memory address, which offset or offsets are in an embodiment based on an index for the block in question (and the memory allocation size and sub-block configuration to be used for that memory allocation size).

This relevant encoding information can be conveyed to the decoder and the decoding process in any suitable and desired manner. In an embodiment it is provided as part of metadata (such as a descriptor or descriptors) for the data array in question.

Other arrangements would, of course, be possible. Again, the decoder and decoding process in an embodiment supports a plurality of different (predefined) memory allocation and sub-block configurations, and is able to, and operates to, select between those different configurations in dependence on the format of the data array and/or the size of the blocks that have been stored. (As discussed above, in embodiments, the uncompressed format of the data array and the size of the blocks (in terms of the number of data elements per block) is conveyed to the decoder and the decoding process. The decoder and decoding process is correspondingly in an embodiment operable to select and use the appropriate memory allocation and sub-block configuration for the indicated uncompressed data array format and block size.)

Thus, in an embodiment, the decoder and the decoding process of the technology described herein supports a plurality of different (predefined) memory allocation and sub-block configurations, each associated with a respective different uncompressed data array format and block size, and operates to select (and then use) one of the defined memory allocation and sub-block configurations based on the uncompressed format of the data array and size of the block(s) that have been compressed and stored.

(Equally, as discussed above, there may be data array formats where operation in the manner of the technology described herein is not used. Thus, the decoder and decoding process is in an embodiment operable to and configured to selectively operate in the manner of the technology described herein when decompressing blocks of a data array, again in an embodiment in dependence upon the format of the data array and the block size that is being stored.)

The technology described herein also extends to a method and system that both stores and then reads data for a data array in the manners discussed above.

The method and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of the stored data array being a frame (a frame buffer), then it may accordingly be, and is in an embodiment, a graphics processor that generates and stores the data in the manner required. In the case of a graphics texture, a graphics processor may be used to generate and store the textures in the manner of the technology described herein.

Thus the technology described herein also extends to a graphics processor that includes the apparatus of the technology described herein, and to a method of operating a graphics processor, comprising the graphics processor storing an array of data in the manner of the technology described herein.

Similarly, on the data reading (decoding) side of the operation, in the case of texture data, for example, it may be a graphics processor that reads (decodes) the stored data array, and in the case for a frame for display, it could be a display controller for a display that reads (decodes) the stored data array.

In an embodiment, the technology described herein is implemented in a graphics processor, a display controller, an image signal processor, a video decoder or a video encoder, and thus the technology described herein also extends to a graphics processor, a display controller, an image signal processor, a video decoder or a video encoder configured to use the methods of the technology described herein (and that is using the methods of the technology described herein), or that includes the apparatus of the technology described herein, or that is operating in accordance with the methods of the technology described herein.

As will be appreciated from the above, the, e.g. graphics processor, that is operating in the manner of the technology described herein may, and in an embodiment does, comprise an appropriate encoder/decoder (encoding/decoding apparatus) that is operable in the manner of the technology described herein. There may be a single such encoder/decoder, or more than one encoder/decoder.

The encoder(s)/decoder(s) may be arranged in any suitable and desired position within the overall system architecture of the, e.g., graphics processor and/or data processing system that the processor is part of. For example, the encoder/decoder may be associated with a memory of the system (and act to encode data as it is stored in the memory and/or decode data as it is read from the memory). Additionally or alternatively, the encoder/decoder may be associated with a cache or caches of the system, e.g. that are part of a cache hierarchy between the main memory and the processor or processing units that will process the data. In this case therefore, there may be an encoder/decoder that operates in the manner of the technology described herein that is operable to encode (compress) data as it is written out from a cache to memory, and correspondingly to decode (decompress) data as it is read from memory and stored into a cache.

Other arrangements would, of course, be possible. As discussed above, in an embodiment the encoder/decoder comprises (local) storage, e.g. a buffer, configured to store data that is to be encoded or decoded, e.g. while the data is being encoded or decoded and/or before the data is written out. Thus, the data will be temporarily buffered in the encoder/decoder while it is being encoded/decoded, before it is written, etc.

Subject to any hardware necessary to carry out the specific functions relating to the technology described herein, a graphics processor, display controller, image signal processor, video decoder or video encoder can otherwise include any one or more or all of the usual functional units, etc., the graphics processors, display controllers, image signal processors, video decoders or video encoders include.

The memory where the (compressed) data blocks are stored may comprise any suitable such memory and may be configured in any suitable and desired manner. For example, it may be an on-chip buffer or it may be an external memory. Similarly, it may be dedicated memory for this purpose or may be part of a memory that is used for other data as well.

In an embodiment, the blocks for the data array are stored in main memory of the overall data processing system. This may be a main memory for the graphics processing system (e.g. where there is a separate memory system for the graphics processor), or a main memory of the data processing system that is shared with other elements, such as a host processor (CPU), of the data processing system.

Any header data (headers) is in an embodiment stored in the same physical memory as the blocks of the data array, although that is not essential.

Other memory arrangements would, of course, be possible. In an embodiment, the data processing system and/or processor also comprises, and/or is in communication with, one or more memories and/or memory devices that store the data described herein, and/or that store software for performing the processes described herein. The data processing system and/or processor may also be in communication with a host microprocessor, and/or with a display for displaying images based on the data array(s).

The technology described herein is in an embodiment implemented in a data processing system that may include, for example, one or more processors, such as a graphics processor, a display controller (display processor), a video processor, etc., that may operate with data arrays in the manner of the technology described herein, together with a host processor (CPU) and a memory or memories that stores the data arrays. There may also, e.g., be a display, e.g. for displaying frames that have been stored in the manner of the technology described herein.

Thus, in embodiments, the technology described herein is configured to handle data array(s), which contribute to (which form) a useful output, such as a graphics texture for use when generating a frame for display, a frame for display, or an output from a machine learning process (such as a regression, classification or other machine learning determination).

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like. It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically the way that an array of data 20 is stored in embodiments of the technology described herein. The array of data 20 is a two-dimensional data array containing a plurality of data elements (containing data entries at a plurality of particular positions within the array). The data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBa, or luminance and chrominance, values for the texel). In the case of a frame for display, each data entry (position) in the array will indicate a set of colour values (e.g. RBG values) to be used for displaying the frame on a display.

As shown in FIG. 1, to store the data array 20 in memory, the data array 20 is divided into a plurality of non-overlapping, equal size and uniform blocks 21, each block corresponding to a particular region of the data array 20. Each block 21 of the data array may, for example, correspond to a block of 16×16 elements (positions) within the data array 20 (i.e. a block of 16×16 texels in the case of a texture map). Other arrangements would, of course, be possible.

To store the data array 20 in memory, an appropriate set of "payload" data is stored for each block 21 that the data array is divided into. This block "payload" data is stored in memory in a "payload" buffer (such as a texture buffer or frame buffer) 25.

As shown in FIG. 1, in the technology described herein, each block of the data array 20 has a corresponding memory allocation 26 within the payload buffer 25 where the data for that block of the data array will be stored. The memory allocations 26 for the respective blocks are stored in the payload buffer 25 one after another, as shown in FIG. 1, in an order that is based on corresponding indices for the blocks of the data array 20 (the blocks are indexed in sequence, e.g. in raster order, e.g. across the data array, to allow them to be identified). The organisation of these memory allocations in the payload buffer and how the data for blocks of a data array are stored in their memory allocations in the present embodiments will be described in more detail below.

In the present embodiments, rather than storing the data array 20 in its full, original form, each data array block 21 is encoded using a variable rate compression scheme to give an encoded representation of the original data that has (that should have) a reduced size as compared to the data in its original, unencoded form. This compresses the original data, thereby making its storage and processing more efficient. Any suitable and desired variable rate, block-based, encoding (compression) process can be used for this encoding.

Thus, in the present embodiments, each block of the data array 20 is encoded and compressed before it is stored, so the data that is stored in respect of a block 21 is data that can be appropriately decoded to derive the data entries for the block.

As well as storing payload data in the payload buffer 25 for each block 21 that the data 20 is divided into, a header data block 23 is also stored for each block 21 that the data array 20 has been divided into. These headers are stored in a header buffer 24 in memory. The header buffer 24 starts at a start address A in memory, and the headers 23 are each stored at a memory address within the header buffer 24 that is determined from (based on) the index (e.g. within the data array) for the block 21 that the header 23 relates to.

In the present embodiment, each header data block 23 in the header buffer 24 has the same, fixed size, corresponding to the burst size used by the data processing system in which the stored data array is to be used. This means that the header data blocks 23 are of a size that can be fetched using a system friendly burst size.

Each header 23 contains an appropriate indication of the size of the (compressed) data that has been stored for the block in question (in bytes).

Other arrangements for the headers would, of course, be possible. The header buffer 24 and payload buffer 25 may be stored in any suitable memory of the data processing system in question. Thus, for example, they may be stored in an on chip memory or in an external memory, such as a main memory of the data processing system. They are in an embodiment stored in the same physical memory, but that is not essential.

As discussed above, in the present embodiments each block of a data array to be stored is allocated a corresponding memory allocation 26 in the payload buffer 25 that stores the (compressed) blocks of the data array 20. The organisation of the memory allocations 26 for respective blocks of a data array in the present embodiments will now be described in more detail with reference to FIGS. 2-4.

In the present embodiments, a lossless variable rate encoding scheme is used, and each block of a data array to be stored is allocated a memory allocation 26 that corresponds to the size of the block in its uncompressed form. This facilitates random access to the individual blocks of the data array when using a lossless variable rate compression scheme.

The size of the memory allocations will accordingly depend upon the size of the block (in terms of the number of data elements in the block), and the uncompressed amount of data for each data element of the block (which will depend upon the format of the data for the data element). For example, a 16×16 block of R10G10B10α10 data elements will have an uncompressed (maximum) size of 640 bytes, and so in that case each block will have a memory allocation of 640 bytes.

In the present embodiments, and in accordance with the technology described herein, each memory allocation for a block is further divided into a plurality of memory allocation sub-blocks, comprising at least one larger size sub-block and at least one smaller size sub-block. In the present embodiments, each memory allocation for a block is divided into n larger sub-blocks of size A (where n is an integer greater than 0), and one smaller sub-block of size B (i.e. A>B).

In the present embodiments, the larger sub-block size is an integer multiple of the smaller sub-block size (i.e. A=mB), and is in an embodiment double or four times the smaller sub-block size.

The sub-division of the memory allocations for blocks of a data array into respective sub-blocks is also done so as to be, so far as possible, compatible with any memory system constraints (and in particular any memory access constraints) of the data processing system in question. In particular, the memory allocations and sub-block configurations for the memory allocations are configured so as to be compatible with any minimum efficient memory transaction size (e.g., and in an embodiment, corresponding to the minimum amount of data that will be written or read in a similar single memory transaction), and any memory transaction interleaving boundaries, such as may arise in the case where there are plural (e.g. 2) independent channels to memory, e.g. with the memory address space then being striped across the two channels in an interleaved format.

In the present embodiments, to account for this, the memory allocations and the sub-blocks used for the memory allocations for blocks of a data array are configured such that any given sub-block should not cross a memory channel interleaving boundary, and such that memory transactions for blocks of the data array will have addresses aligned with the distribution of the address space across the memory channels.

For example, if the minimum efficient memory transaction size is p bytes, and there are two memory channels, with the memory channel address interleaving (striping) being done on the basis of every other 4p byte address chunk, the memory allocation and sub-block configurations in the present embodiments are set so as to be optimised (so far as possible) for the following memory system traits: that the minimum efficient memory transaction is p bytes; that transactions should not cross a 4p byte alignment boundary; that when possible, transactions will have address and length aligned on 4p bytes; and that when alignment of address and length on 4p bytes is not possible, transactions will be as few and as long as possible.

Following these principles, and assuming a minimum efficient memory transaction size of 64 bytes, with memory channel address interleaving being done on the basis of 256 byte "stripes", the present embodiments use the following sub-block configurations for the following different block sizes:

| Uncompressed block size (bytes) | n Number of larger sub-blocks | A Larger sub-block size (bytes) | B Smaller sub-block size (bytes) |
|---|---|---|---|
| 48 | 1 | 32 | 16 |
| 96 | 1 | 64 | 32 |
| 192 | 1 | 128 | 64 |
| 320 | 1 | 256 | 64 |
| 384 | 1 | 256 | 128 |
| 640 | 2 | 256 | 128 |

For a given data array and uncompressed block size, the above memory allocation sub-block configurations will be used for each block of the data array that is to be stored. Furthermore, the memory allocations and the individual sub-blocks within those memory allocations will be configured within the memory address space so as to align with any memory channel address and minimum size memory transaction boundaries so far as is possible.

This is done by storing the memory allocations and the sub-blocks within those memory allocations at memory offsets from a base address for the buffer where the data array is being stored (which base (start) address for the buffer is correspondingly aligned with a memory channel address boundary), which memory address offset is determined based on the index of the block, e.g. within the data array, and a corresponding per-block or per-block offset that is configured so as to align the memory allocations and the sub-blocks with the appropriate memory channel and/or minimum memory transaction boundaries. The offsets that are used in this regard for the different uncompressed block sizes that are supported in the present embodiments will be discussed further below.

When a block falls to be compressed and stored in the embodiments of the technology described herein, the compressed data for the block will be stored in the payload buffer memory allocation for the block using the different sub-blocks within that memory allocation. As will be appreciated by those skilled in the art, it may be (and typically will be) the case that a compressed block may not completely fill the memory allocation for the block, such that, for example, the memory allocation may not fill all the sub-blocks of the memory allocation for the block. The present embodiments therefore operate to only store the compressed data for a block in so many sub-blocks of the memory allocation as are required to store that data.

In the present embodiments, this is done on a "best fit" basis, i.e. the sub-block or sub-blocks that are the "best fit" for the compressed block are used to store the compressed block. This will then minimise the memory transactions needed for storing (and consequently for reading) the compressed block, and will also have the effect that the storage layout (in terms of the sub-blocks that are used) within the memory allocation for a block will depend on the size of the compressed data for the block. It will also facilitate potential merging of writes for smaller sub-blocks across different blocks that are being compressed and stored.

In order to achieve this "best fit" operation, in the present embodiments, it is determined whether the data to be written for a compressed block is greater than the size of the smaller sub-block of the memory allocation. If not, the compressed block is written to the smaller sub-block (and that completes the writing of the block), but if so, then the data for the compressed block is written to the larger sub-block. This process is repeated if there is then any remaining data, until the compressed block has fully been written to the memory.

Figure 2:
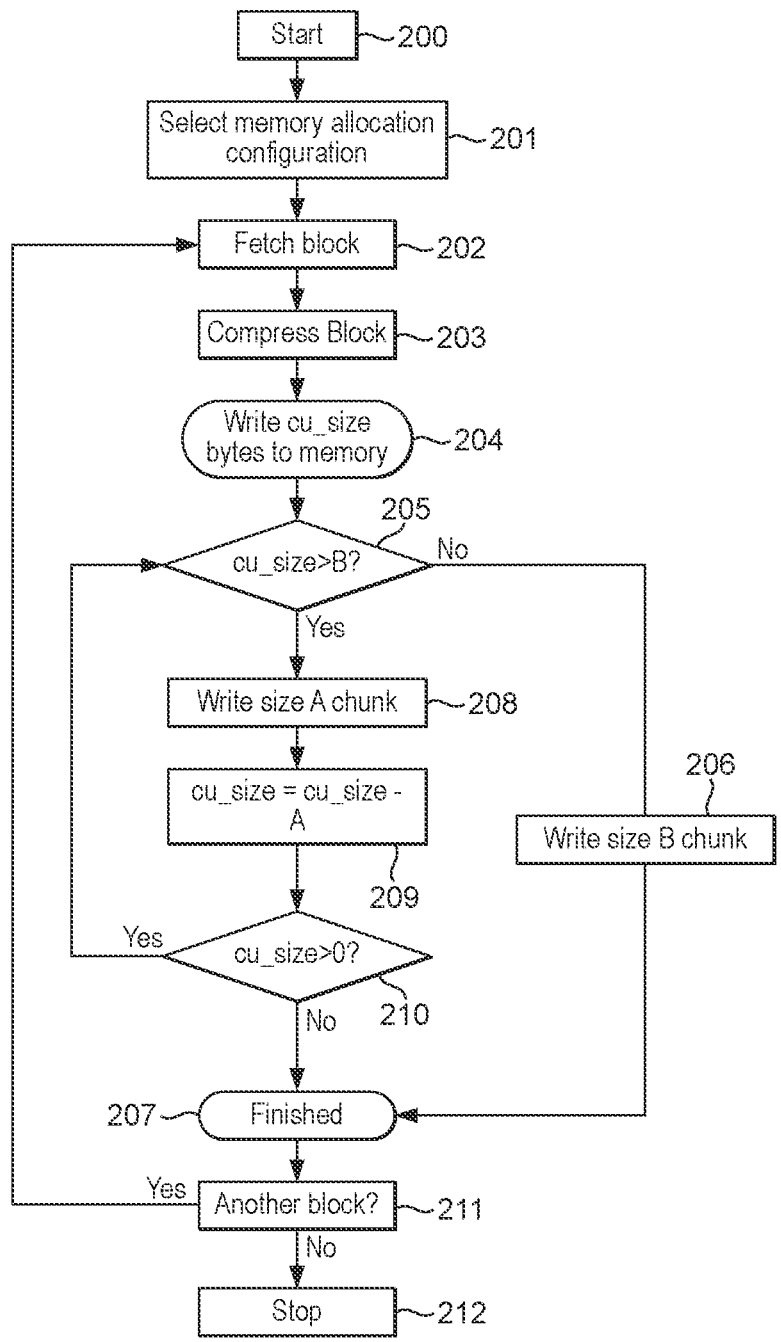
FIG. 2 shows storing of blocks of a data array in memory in an embodiment of the technology described herein.

FIG. 2 shows this operation in the embodiments of the technology described herein. As shown in FIG. 2, the process will start (step 200) with a data array to be encoded and stored (step 200). The appropriate memory allocation configuration for the data array (based on the uncompressed size of the blocks that the data array will be divided into) will then be determined and selected (step 201).

A block of the data array (step 202) will then be processed, by first compressing the block (step 203) using the desired variable rate compression scheme. It will then be necessary to write the compressed data for the block (which will be CU_size bytes, as shown in FIG. 2) to the memory allocation (step 204).

To do this, the compressed size of the block (CU_size) is first compared to the size of the smaller sub-block for the memory allocation for the block (step 205). If the compressed size of the block is not greater than the size of the smaller sub-block of the memory allocation, then the compressed data for the block is written to the smaller sub-block (step 206), which then completes the writing of that compressed block (step 207).

(It should be noted here that once all the compressed data for a block has been written, no further sub-blocks for that block are written but they are retained as part of the memory allocation for the block, in case the block falls to be written again and its compressed size changes.)

On the other hand, if at step 205 it's determined that the compressed size of the block is greater than the size of the smaller sub-block of the memory allocation, the compressed data is instead written to a larger sub-block of the allocation (step 208).

The size of any remaining data for the compressed block is then determined (step 209), and if there is any remaining data to be written after the larger sub-block has been filled, the process is repeated to determine the next sub-block to use for storing the data for the compressed block (step 210) (and so on until all the compressed data for the block has been stored in a sub-block of the blocks memory allocation).

Once there is no remaining data to store for the compressed block, the block is finished (step 207) and the process then moves on to another block (if any) (step 208). This is repeated for all blocks to be stored for the data array until all the blocks (e.g. the entire data array) to be stored have been stored in their respective memory allocations, at which point the storing of the data array is finished (step 212).

The process of writing a compressed block to memory using "best fit" operation can be described through this pseudo code:

```
write_cu_to_memory(cu_size) {
    while (cu_size>0) {
        if (cu_size<=B) {
            write_size_B_chunk( );
            cu_size =0;
        } else {
            write_size_A_chunk( );
            cu_size = cu_size-A;
        }
    }
}
```

The memory allocation and sub-block configuration layouts used for different uncompressed data array block sizes in the present embodiments will now be described in more detail.

FIG. 3 shows an embodiment when storing blocks of a data array which have an uncompressed size of 640 bytes. FIG. 3 shows the memory allocation sub-block configurations 31 for two 640 byte memory allocations 32, 33 (this allocation arrangement will correspondingly be repeated for subsequent 640 byte allocations).

In this case, as shown in FIG. 3, the 640 byte memory allocation for a given block of the data array is divided into three sub-blocks, namely two 256 byte sub-blocks and one, smaller, 128 byte sub-block. As shown in FIG. 3, for even index (numbered) blocks, the allocation starts with two 256 byte sub blocks, followed by a 128 byte sub-block. For odd index (numbered) blocks the allocation starts with a 128 byte sub-block, followed by two 256 bytes sub-blocks (in the memory address order).

FIG. 3 also shows how the sub-blocks of the memory allocations align with (and are distributed across) the memory channel stripes (granules) 40.

FIG. 3 correspondingly shows the memory address offsets 34 (from a base (start) address for the payload buffer for the data array) that are used for the respective sub-blocks for the memory allocations for the blocks. Each sub-block occupies a contiguous memory address range, and in this case, each block is allocated a contiguous region of memory (memory address range).

In particular, even index (numbered) blocks are stored starting in an offset n*640, progressing linearly up in address until the whole block is stored (where n is the block index), and odd numbered blocks are stored starting at an offset n*640+128 (e.g. offset 768, 2048, 3328, for n=1, 3, 5), progressing linearly up in address until the end of the block (512 bytes). If a block is larger than 512 bytes then the last one 128 bytes are stored at offset n*640.

This ensures as much as possible of the blocks are accessed with aligned transactions. It can be seen from this, that each sub-block will be appropriately aligned with the minimum memory transaction size of 64 bytes, and the memory channel address width of 256 bytes (as discussed above).

In this case, when storing the compressed data for a block of the data array (a compressed block), the memory transaction size is rounded up to the next multiple of 64 bytes (being the minimum memory transaction size), and then the compressed block is stored in the sub-blocks of the memory allocation for the block following a "best fit" approach. In particular, when the (rounded up) compressed block occupies 128 bytes or less, then only the 128 byte sub-block is used. When the compressed block is greater than 128 bytes but less than 256 bytes, then only one (and the first) 256 byte sub-block is used. When the compressed block is between 256 bytes and 384 bytes, then both the first 256 byte sub-block and the 128 byte sub-block are used, and so on.

FIG. 3 shows an example sub-block usage and layout 35 for two compressed blocks in this arrangement, where the first compressed block (CU0) occupies 320 bytes, and the second compressed block (CU1) occupies 384 bytes.

As is shown in FIG. 3, in this case, for the first, 320 byte compressed block, the first 256 bytes of that block are stored in the first sub-block 36 of the memory allocation for that block, with the remaining 64 bytes 37 then being stored in the 128 byte sub-block for that block. For the second block that occupies 384 bytes, the first 256 bytes of that block are stored in the first larger sub-block 38 of the memory allocation for that block, and the remaining 128 bytes are then stored in the smaller, 128 byte sub-block 39 for that block.

The memory allocation and arrangement for blocks of a data array which have an uncompressed size of 384 bytes will be similar to the arrangement illustrated in FIG. 3 for blocks having an uncompressed size of 640 bytes, except that the memory allocations for each block will only have one larger, 256 byte sub-block (and one smaller 128 byte sub-block). Again, transaction sizes will be rounded up to the next multiple of 64 bytes, and each memory allocation for a data block will be allocated a contiguous memory region.

In this case even index (numbered) (blocks) will have a memory allocation starting with one 256 byte sub-block followed by a 128 byte sub-block, with odd index (numbered) blocks having one 128 byte sub-block followed by one 256 byte sub-block (in the memory address order).

Thus, for example, block index 0 will be allocated bytes 0 through 383, with the 256 byte sub-block being bytes 0 through 255 and the 128 byte sub-block being bytes 256 through 383. Block index 1 will be allocated bytes 384 through 767, with the 256 byte sub-block being bytes 512 through 767 and the 128 byte sub-block being at bytes 384 through 511 (and so on for subsequent blocks in the index sequence).

In this case, again, when only 64 or 128 bytes need to be stored for a compressed block, then only the 128 byte sub-block is used. When 192 or 256 bytes are to be stored for a compressed block then only the 256 sub-block is used, and when 320 or 384 bytes are to be stored for a compressed block then both the 256 byte sub-block and the 128 byte sub-block are used.

In the case of blocks of a data array having an uncompressed size of 320 bytes, then each such block is allocated a memory allocation of 320 bytes, comprising one larger, 256 byte sub-block, and one smaller 64 byte sub-block. As these memory allocation sizes have a modulo 256 of 64, such that a group of four block memory allocations will align on 256 bytes, each group of four blocks is allocated a contiguous area of 1280 bytes.

Within the allocated four block group area, the block with index n within the group of 4 blocks (assuming the blocks are indexed 0, 1, 2, 3 within the group) is allocated 256 bytes of storage at an offset of n*256, and 64 bytes of storage at offset 1024+n*64. Thus, for example, the block having the index 0 in a group of four blocks will be allocated bytes 0 through 255 and 1024 through 1087 in the allocation for the group of four blocks, block index 1 will be allocated bytes 256 through 511 and 1088 through 1151, block index 2 will be allocated bytes 512 through 767 and 1152 through 1215, and block index 3 will be allocated bytes 768 through 1023 and 1216 through 1279 in the memory allocation region for the four blocks.

Figure 4:
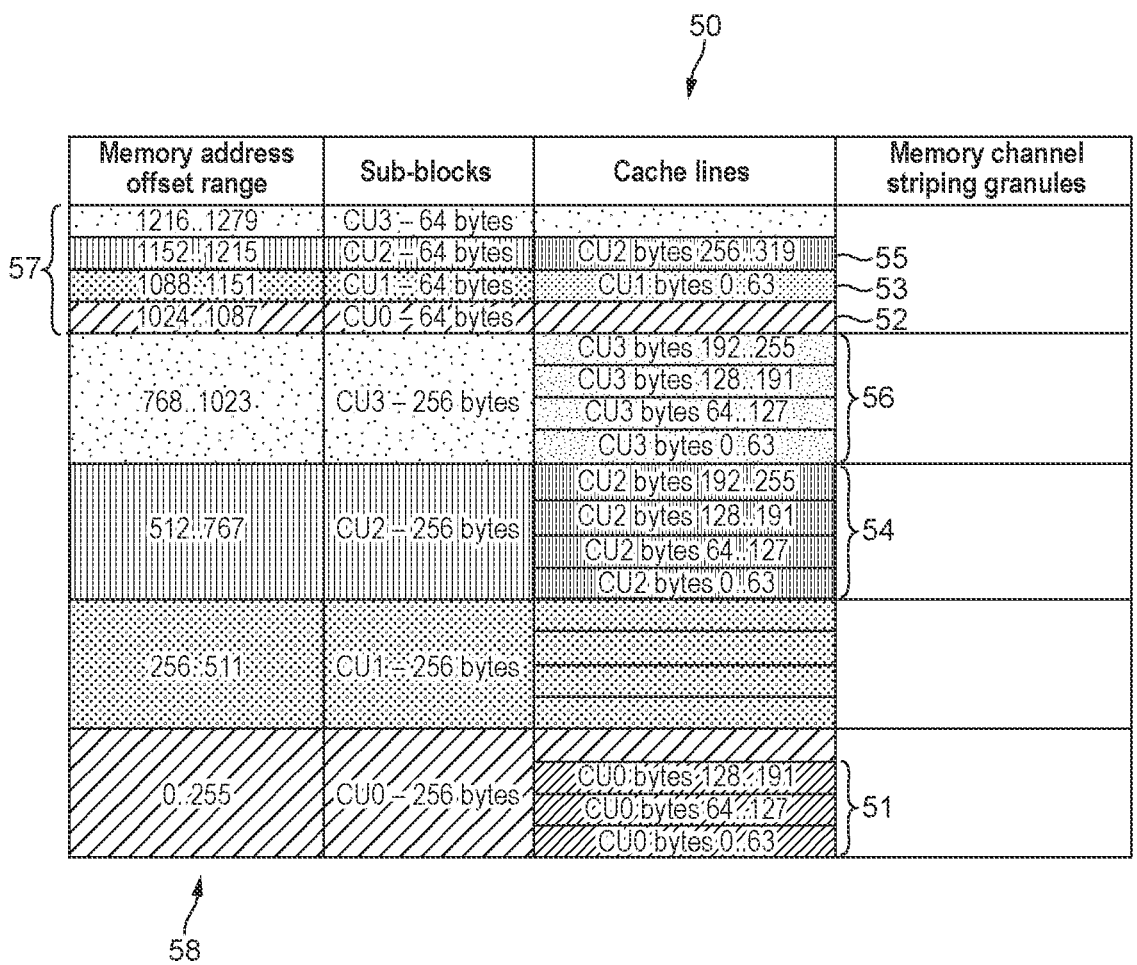

FIG. 4 shows an example memory allocation and sub-block layout 50 for a group of four blocks in this arrangement. Thus, FIG. 4 shows an arrangement of four 320 byte memory allocations, each comprising one larger sub-block of 256 bytes, and one smaller sub-block of 64 bytes. As shown in FIG. 4, in this case, the larger sub-blocks for each block are allocated in sequence first, with the smaller sub-blocks for each block being stored together within the same memory channel width 57. FIG. 4 also shows the memory address offsets 58 that are used for the respective sub-blocks for the memory allocations for the blocks.

When storing compressed blocks in their memory allocations in this arrangement, again the memory transaction sizes are rounded up to the next multiple of 64 bytes, and when 64 bytes are stored for a compressed block, then only the 64 byte sub-block is used. Correspondingly, when 128 or 256 bytes are to be stored for a compressed block then only the 256 byte sub-block is used, but when 320 bytes are to be stored for a compressed block, then both the 64 byte sub-block and 256 byte sub-block for the block are used.

FIG. 4 shows the memory allocation and sub-block usage for a group of four blocks in this arrangement where the first compressed block (CU0) holds 192 bytes of data, the second compressed block (CU1) holds 64 bytes of data, the third compressed block (CU2) holds 320 bytes of data and the fourth compressed block (CU3) holds 256 bytes of data.

As is shown in FIG. 4 for the first, 192 byte compressed block (CU0), the 192 bytes for that block are stored in the first sub-block 51 of the memory allocation for that block. The smaller sub-block 52 for that block is not used.

For the second, 64 byte block (CU1), the 64 bytes for that block are stored in the smaller sub-block 53 only for that block.

For the third, 320 byte compressed block (CU2), that block is stored using both the larger sub-block 54 and the smaller sub-block 55 for that block. For the fourth, 256 byte block (CU3), that block is stored using (the entirety of) the larger sub-block 56 for that block.

In the case of blocks of a data array having an uncompressed size of 192 bytes, then each sub-block is allocated a memory allocation of 192 bytes, comprising one larger, 128 byte sub-block and one smaller, 64 byte sub-block. As a group of four of these memory allocation sizes will align on 256 bytes, each group of four blocks is allocated a contiguous area of 768 bytes.

In this case, each block is allocated a contiguous area of 192 bytes, comprising a larger 128 byte sub-block and a smaller 64 byte sub-block. The sub-blocks are organized such that the 128 byte sub-block is aligned on a 128 byte boundary within the allocation. The organization of the allocation depends on the block index:

for blocks numbered (indexed) such that the block index modulo 4 is 0 (e.g. block 0, 4, 8 and so on, with allocation offsets of 0, 768, 1536 and so on), the 128 byte chunk is at offset 0 in the allocation and the 64 byte chunk at offset 128;

for blocks indexed such that the block index modulo 4 is 1 (e.g. blocks 1, 5, 9 and so on, with allocation offsets of 192, 960, 1728 and so on), the 128 byte sub-block is at offset 64 in the allocation and the 64 byte sub-block at offset 0;

for blocks indexed such that the block index modulo 4 is 2 (e.g. blocks 2, 6, 10 and so on, with allocation offsets of 384, 1152, 1920 and so on), the 128 byte sub-block is at offset 0 in the allocation and the 64 byte sub-block at offset 128;

for blocks indexed such that the block index modulo 4 is 3 (e.g. blocks 3, 7, 11 and so on, with allocation offsets of 576, 1344, 2112 and so on), the 128 byte sub-block is at offset 64 in the allocation and the 64 byte sub-block at offset 0.

In this case, at least in the case of a memory channel striping granularity of 256 bytes, for blocks numbered (indexed) such that the block index modulo 4 is 0 (i.e. that start at an offset of 0 bytes within a memory channel/stripe) and for blocks indexed such that the block index modulo 4 is 3 (i.e. that start at an offset of 64 bytes within a memory channel stripe), the complete 192 byte memory allocation will fit within the same memory channel stripe (will not cross a memory channel stripe (a channel interleaving boundary). In this case, for those blocks, the memory allocations are in an embodiment considered as comprising a single sub-block of 192 bytes, that is used irrespective of how much data there is to be stored to the memory allocation for the block in question.

On the other hand, for blocks indexed such that the block index modulo 4 is 1 and for blocks indexed such that the block index modulo 4 is 2, such that the block allocation will cross a memory channel interleaving boundary, the memory allocation is treated as comprising a larger 128 byte sub-block and a smaller 64 byte sub-block. In this case, when storing data to a memory allocation, transaction sizes are rounded up to the next multiple of 64 bytes, and when 64 bytes are stored, then only the 64 byte sub-block is used, when 128 bytes are stored, then only the 128 byte sub-block is used, and when 192 bytes are stored, then both the 128 byte sub-block and the 64 byte sub-block are used.

It can be seen that in this case, although each block of the data array will have the same sized memory allocation, some of the memory allocations will be in effect treated and handled as contiguous "full sized" memory allocations (as a single sub-block comprising the entire memory allocation), whereas the memory allocations for other blocks of the data array (and in particular depending upon the block position (index) in the sequence of blocks in question) will be handled in the manner of the technology described herein, i.e. as comprising a larger sub-block and a smaller sub-block. Thus the memory allocations for the blocks of the data array will either be treated as comprising a single contiguous sub-block of memory, or as comprising a larger sub-block and a smaller sub-block, depending upon the block index.

FIG. 5 shows an exemplary memory allocation and sub-block usage for a group of four blocks in this arrangement where the first compressed block (CU0) holds 64 bytes of data, the second compressed block (CU1) holds 192 bytes of data, the third compressed block (CU2) holds 128 bytes of data, and the fourth compressed block (CU3) holds 192 bytes of data.

In the case of blocks of a data array having an uncompressed size of 96 bytes, then each sub-block is allocated a memory allocation of 96 bytes, comprising one larger, 64 byte sub-block, and one smaller, 32 byte sub-block.

When storing a block having an uncompressed size of 96 bytes, the memory transaction size is rounded up to the next larger multiple of 32 bytes, and when storing 32 bytes, the 32 byte sub-block is used, when storing 64 bytes, the 64 byte sub-block is used, and when storing 96 bytes, the whole allocation is used.

FIG. 6 shows the memory allocation and sub-block usage for a group of two blocks in this arrangement where the first compressed block (CU0) holds 32 bytes of data and the second compressed block (CU1) holds 96 bytes of data. FIG. 6 illustrates how the sub-blocks and stored data are allocated to respective (64 byte) cache lines (as the memory allocations for the blocks fit within a single memory channel stripe).

In the case of blocks of a data array having an uncompressed size of 48 bytes, then each such block is allocated a memory allocation of 48 bytes, comprising one larger, 32 byte sub-block, and one smaller 16 byte sub-block.

In this case, at least in the case of a minimum efficient memory transaction of 64 bytes, for blocks numbered (indexed) such that the block index modulo 4 is 0 (i.e. that start at an offset of 0 bytes within a cache line) and for blocks indexed such that the block modulo 4 is 3) (i.e. that start at an offset of 16 bytes within a cache line), the complete 48 byte memory allocation will fit within the same cache line (will not cross a minimum memory transaction (cache line) boundary). In this case, for those blocks, the memory allocations are in an embodiment considered as comprising a single sub-block of 48 bytes, that is used irrespective of how much data there is to be stored to the memory allocation for the block in question.

On the other hand, for blocks indexed such that the block index modulo 4 is 1 and for blocks indexed such that the block index modulo 4 is 2, such that the block allocation will cross a cache line boundary, the memory allocation is treated as comprising a larger 32 byte sub-block and a smaller 16 byte sub-block. In this case, when storing blocks having an uncompressed size of 48 bytes, the memory transaction size is rounded up to the next larger multiple of 16 bytes. When storing 16 bytes, the 16 byte sub-block is used, when storing 32 bytes, the 32 byte sub-block is used, and when storing 48 bytes, the whole allocation is used.

FIG. 7 shows the memory allocation and sub-block usage for a group of four blocks in this arrangement where the first compressed block (CU0) holds 16 bytes of data (but 48 bytes is written in the single 48-byte sub-block), the second compressed block (CU1) holds 48 bytes of data, the third compressed block (CU2) holds 32 bytes of data, and the fourth compressed block (CU3) holds 48 bytes of data. FIG. 7 illustrates how the sub-blocks and stored data are allocated to respective (64 byte) cache lines (as the memory allocations for the blocks fit within a single memory channel stripe).

In the case of 96 byte blocks and 48 byte blocks, the system in an embodiment uses a cache when reading and writing these block sizes to improve efficiency (as these block sizes are not a multiple of the minimum efficient memory transaction size). For example, when reading, a cache may be used to ensure that any extra data fetched when only a part of a cache line is used for a block can be available for subsequent blocks. When writing, a cache can be used to buffer partial writes to a cache line, and to allow complete blocks to be written to memory.

In operation to encode a data array 20 in the manner of the present embodiment, a suitably configured and/or programmed processing circuit will receive and/or fetch from memory a stream of data representing the data array 20, and operate to divide the data array 20 into blocks as discussed above, generate appropriate header data blocks and store those blocks in a header buffer 24, and generate compressed versions of the blocks of the data array and store data for those encoded versions of the blocks of the data array in the appropriate memory allocations and sub-blocks of the memory allocations in the payload buffer 25 in memory.

A number of additions and variations and changes to the above-described embodiments would be possible if desired. For example, rather than using a "best fit" approach in order to determine which sub-blocks of a memory allocation to use when storing a compressed block, other sub-block determining schemes could be used, such as a "largest first" approach, in which the largest sub-block or sub-blocks of the memory allocation are always used first, and the smaller sub-block is used only if the compressed data does not fit into the available larger sub-block or sub-blocks. This will also minimise the number of memory transactions that are needed for each compressed block.

It would also be possible for the memory constraints, such as the minimum efficient transaction size and the largest transaction size (the memory channel striping width) to not be 64 bytes and 256 bytes, respectively. There could also be, for example, a different minimum (efficient) transaction size for reads and writes. Where a different minimum (efficient) transaction size and largest (efficient) transaction size is present, then the address alignments of the memory allocations in the sub-blocks within the memory allocations should be configured accordingly (as discussed above).

Equally, although in the present embodiments each memory allocation is split into two different sizes of sub-block, there could be three or more different sizes of sub-block used, if desired. For example, a memory allocation of 448 bytes could be split into one 256 byte sub-block, one 128 byte sub-block, and one 64 byte sub-block.

In the present embodiments, when there are multiple sub-blocks of the same size, the sub-block with the lowest address is used first, but in practice any order can be used. Equally, the grouping of the sub-blocks can be different from what has been described above, if desired. For example, for the 384 byte memory allocations, there is no need to keep the 256 byte sub-block and the 128 byte sub-block together. They could instead be located separately in any convenient manner.

In an embodiment, the system also supports other uncompressed block sizes in addition to those described above. For example, in an embodiment, the system also supports uncompressed block sizes (and corresponding memory allocations) of 256, 512 and 1024 bytes. In this case, the allocations are simply allocated sub-blocks having a size of 256 bytes (i.e. not two sub-blocks of different sizes), which are aligned appropriately with the memory channel boundaries.

Similarly, the system also in an embodiment supports uncompressed block sizes of 32, 64 and 128 bytes, which in an embodiment again only use a single sub-block corresponding to the size of the memory allocation, and which are appropriately aligned with the minimum memory transaction size and memory channel boundaries.

The above primarily describes the way in the present embodiments that a data array is processed and stored in memory for use. When the so-stored data array comes to be used, for example to apply to fragments to be rendered (where the stored data array is a texture map for use in graphics processing), then the reading and decoding process for the stored data array will essentially comprise the reverse of the above storing and encoding process.

Thus, the decoding device, such as a graphics processor (e.g. where the stored data array is texture map) or a display controller (e.g., where the stored data array is a frame to be displayed), will first identify the block or blocks of the data array that are of interest (i.e. to be decompressed) and then operate to read the compressed data for the block or blocks in question by reading the appropriate stored sub-blocks of the block or blocks in question, decompress the block or blocks in question and provide the decompressed blocks for use.

The block or blocks of the data array that are to be decompressed can be determined in any suitable and desired manner. For example, this may be based on the positions of the blocks and/or of the particular data elements or elements in the data array that are of interest (i.e. whose values are to be determined).

The decoder will then determine the location of the header for a block of interest (based on the index of the block) and read from that header the size of the stored compressed block. The decoder will then identify the location of the sub-block or sub-blocks that will store the compressed block, based on the index for the block of the data array, a known "per block" or "per-sub-block" memory offset (which will be based on the known uncompressed size of the block for the data array in question), and the size of the compressed data block from the header, read the determined sub-block(s) at the determined memory offsets from the start of the payload buffer that is storing the data array, and once the sub-blocks storing the compressed data for the block have been read, decompress the block appropriately.

Figure 8:
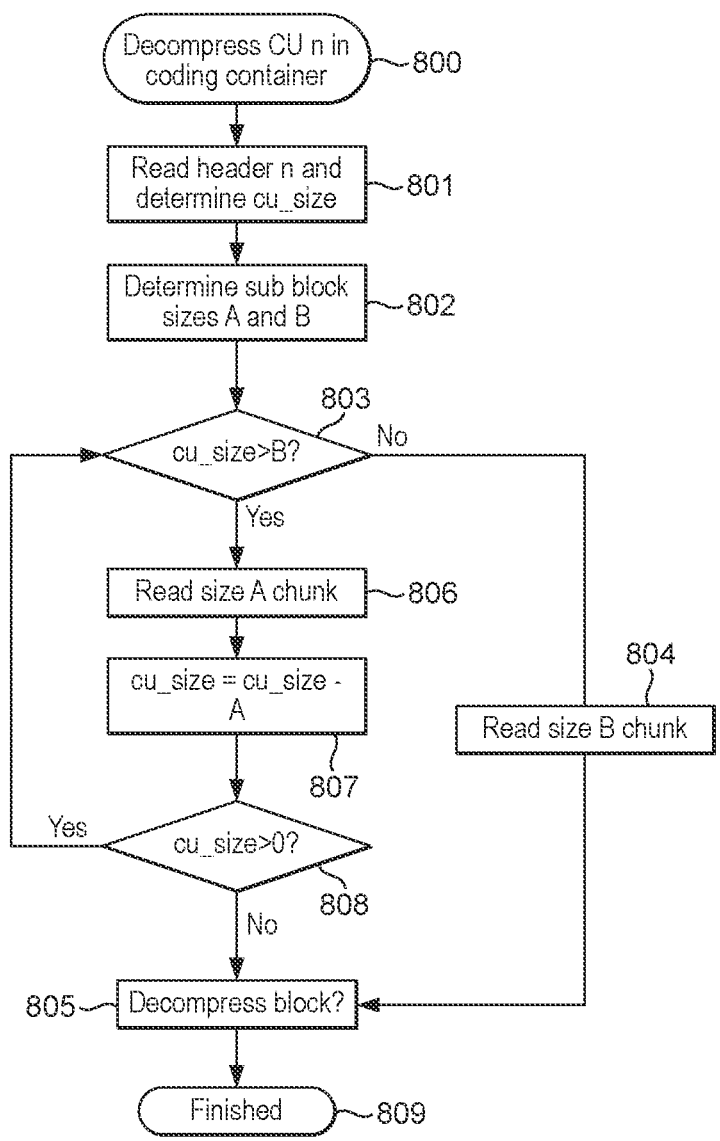
FIG. 8 shows decompressing blocks in an embodiment of the technology described herein.

This process can then be repeated for each block of interest (that is to be decompressed). FIG. 8 shows this operation in the embodiments of the technology described herein.

As shown in FIG. 8, the process will start (step 800) with a block (CU) index n to be decompressed.

The decoder will first read the header for the block index n and determine the stored block size (step 801). It will also determine the appropriate sub-block configuration for the memory allocation that has been used to store the compressed block (step 802).

It will then determine which sub-blocks to read to obtain the compressed block. To do this, the compressed size of the block (CU_SIZE) is first compared to the size of the smaller sub-block of the memory allocation for the block (step 803). If the compressed size of the block is not greater than the size of the smaller sub-block of the memory allocation, then the smaller sub-block for the memory allocation for the block is read (step 804), and the read block data is decompressed (step 805) to provide the decompressed block.

On the other hand, if at step 803 it is determined that the compressed size of the block is greater than the size of the smaller sub-block of the memory allocation, then the larger sub-block of the memory allocation is read instead (step 806).

The size of any remaining data for the compressed block is then determined (step 807), and if there is any remaining data to be read after the larger sub-block has been read, the process is repeated to determine the next sub-block to read for the data for the compressed block (step 808), and so on until all the sub-blocks storing compressed data for the block have been read.

Once there is no remaining data to read for the compressed block, the block is decompressed (step 805) and the process for the block is finished (step 809).

This may then be repeated for a next block of the data array that is required, and so on. The index for the block, the base (start) address for the payload buffer, the uncompressed block size, etc., may be conveyed to the decoder in any suitable and appropriate manner, for example as part of metadata (e.g. descriptors) that is associated with the data array and that are indicated in a command that causes the decoder to decode the block or blocks of the data array.

Other arrangements would, of course, be possible. It will be appreciated in this regard that when decompressing a data array, it may not be necessary to decompose the data array in its entirety, but rather individual blocks of the data array only may be decompressed. This may particularly be so in the case of graphics textures, where only particular regions of the texture are required.

Figure 9:
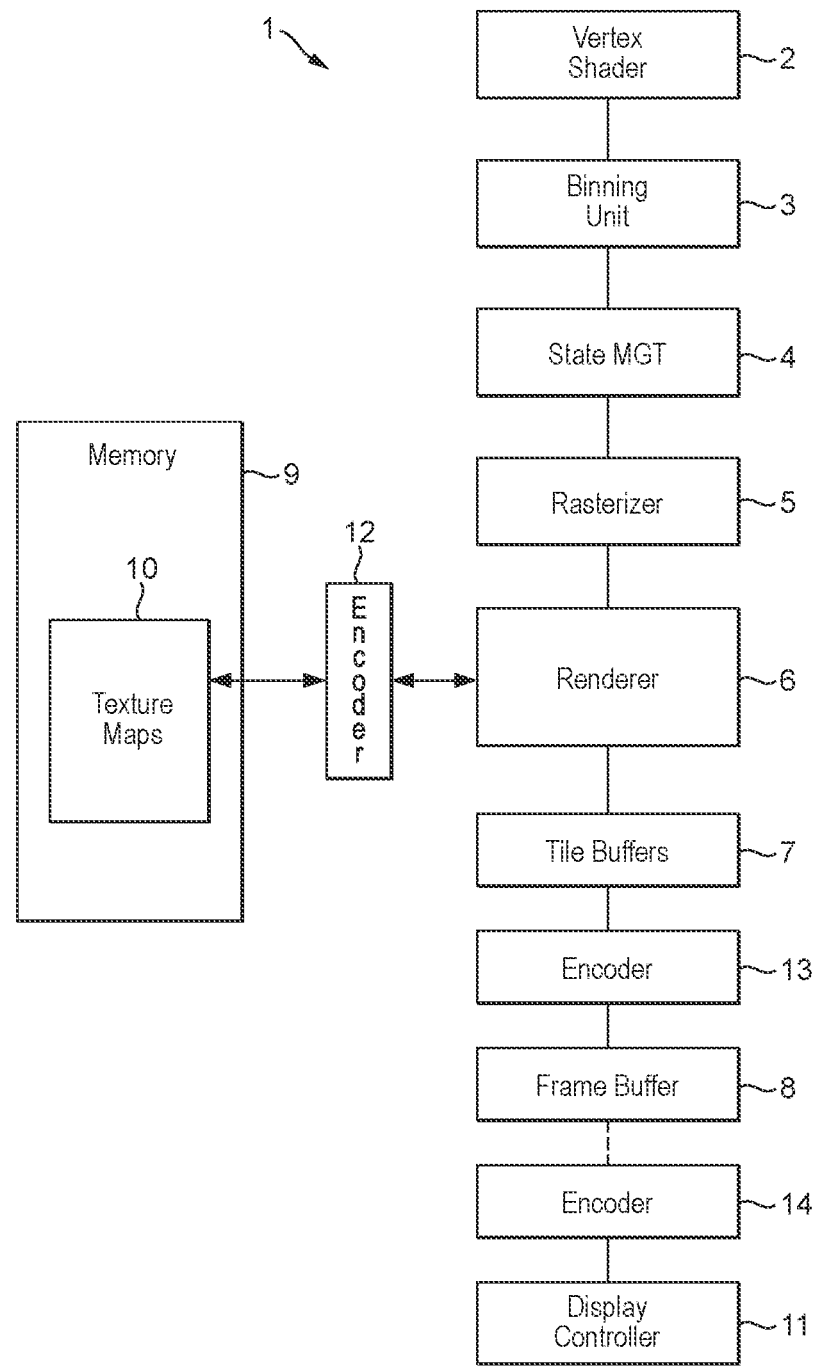
FIG. 9 shows schematically a graphics processing system that may use data arrays stored in accordance with the technology described herein.

FIG. 9 shows schematically an arrangement of a graphics processing system 1 that can store and use data arrays that have been stored in the manner of the present embodiment.

FIG. 9 shows a tile based graphics processing system. However, as will be appreciated, and as discussed above, the technology described herein can be implemented in other arrangements of graphics processing system as well (and, indeed, in other data processing systems).

The system includes, as shown in FIG. 9, a tile based graphics processor (GPU) 1. This graphics processor 1 generates output data arrays, such as output frames intended for display on a display device, such as a screen or printer, in response to instructions to render graphics objects, etc. that it receives.

As shown in FIG. 9, the graphics processor 1 includes a vertex shader 2, a binning unit 3, a state management unit 4, a rasterising stage 5, and a rendering stage 6 in the form of a rendering pipeline.

The vertex shader 2 receives descriptions of graphics objects to be drawn, vertices, etc., e.g. from a driver (not shown) for the graphics processor 1, and performs appropriate vertex shading operations on those objects and vertices, etc., so as to, for example, perform appropriate transform and lighting operations on the objects and vertices.

The binning unit 3 sorts (bins) the various primitives, objects, etc., required for an output to be generated by the graphics processor 1 (such as a frame to be displayed) into the appropriate bins (tile lists) for the tiles that the output to be generated is divided into (since, as discussed above, this exemplary graphics processing system is a tile based graphics processing system).

The state management unit 4 stores and controls state data and the state of the graphics processing units to control the graphics processing operation.

The rasteriser 5 takes as its input primitives to be displayed, and rasterises those primitives to sampling positions and fragments to be rendered.

The rendering pipeline 6 takes fragments from the rasteriser 5 and renders those fragments to generate the output data (the data for the output (e.g. frame to be displayed) of the graphics processor 1).

The rendering pipeline will include a number of different processing units, such as fragment shaders, blenders, texture mappers, etc. Other rendering arrangements, such as using ray-tracing or hybrid ray-tracing would also or instead be possible, if desired.

As shown in FIG. 9, the rendering unit 6 may, inter alia, access texture maps 10 stored in a memory 9 that is accessible to the graphics processor 1, so as to be able to apply the relevant textures to fragments that it is rendering. The memory 9 where the texture maps 10 are stored may be an on chip buffer or external memory (e.g. main system memory) that is accessible to the graphics processor 1.

The graphics processor 1 generates its output data arrays, such as output frames, by generating tiles representing different regions of a respective output data array (as it is a tile based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR SDRAM) of the system (not shown). The data from the tile buffers may be downsampled before it is written to the frame buffer, if desired.

The texture maps 10 and the frame buffer 8 may be stored in the same physical memory, or they may be stored in different memories, as desired.

Sometime later, the data array in the frame buffer 3 will be read by a display controller 11 and output to a display device for display (not shown).

The graphics processing system shown in FIG. 9 uses the data array storing and decoding arrangement of the present embodiments in respect of both the stored texture maps 10 in the memory 9, and when storing its output data in the frame buffer 8.

Thus, each texture map 10 that is stored in the memory 9 for use by the rendering unit 6 is stored in the form described above. Accordingly, there is a data encoder 12 that, when the rendering unit 6 needs to access a texture map, reads and decodes the texture map data in the manner described above to provide the decompressed texture to the renderer 6.

Similarly, when the generated output data from the graphics processor 1 is written to the frame buffer 8 from the tile buffer 7, that data is processed by a data encoder 13 to take the data from the tile buffers 7 and store it in the format of the present embodiments in the frame buffer 8. This data can then be read and decoded from the frame buffer 8 by a data encoder 14 for providing to the display controller 11 of the display on which the frame is to be displayed.

It will be appreciated in this regard that the data encoders 12, 13 and 14 shown separately in FIG. 9 may in practice all be the same data encoder (or two of those encoders may be the same encoder), depending upon the underlying hardware configuration of the system. Equally, the encoder or encoders can be arranged in any appropriate location within the overall system. For example, they may be coupled to the memories where the data arrays are stored, and/or they be associated with caches of the cache hierarchy between the memory or memories and the processing unit that will require the data in question.

It will be appreciated that each of the stages, elements, and units, etc., of the graphics processor as shown in FIG. 9 may be implemented as desired and will accordingly comprise, e.g., appropriate circuits/circuitry, and/or processing logic, programmable logic, etc., for performing the necessary operations and functions, and will provide the appropriate control and processing circuits/circuitry, etc., for performing the technology described herein.

It will also be appreciated here that FIG. 9 simply shows the arrangements schematically, and thus, for example, the data flow in operation of the technology described herein need not and may not be as shown in FIG. 9, but may, for example, involve the looping back of data as between the various units and stages shown in FIG. 9 as appropriate.

Figure 10:
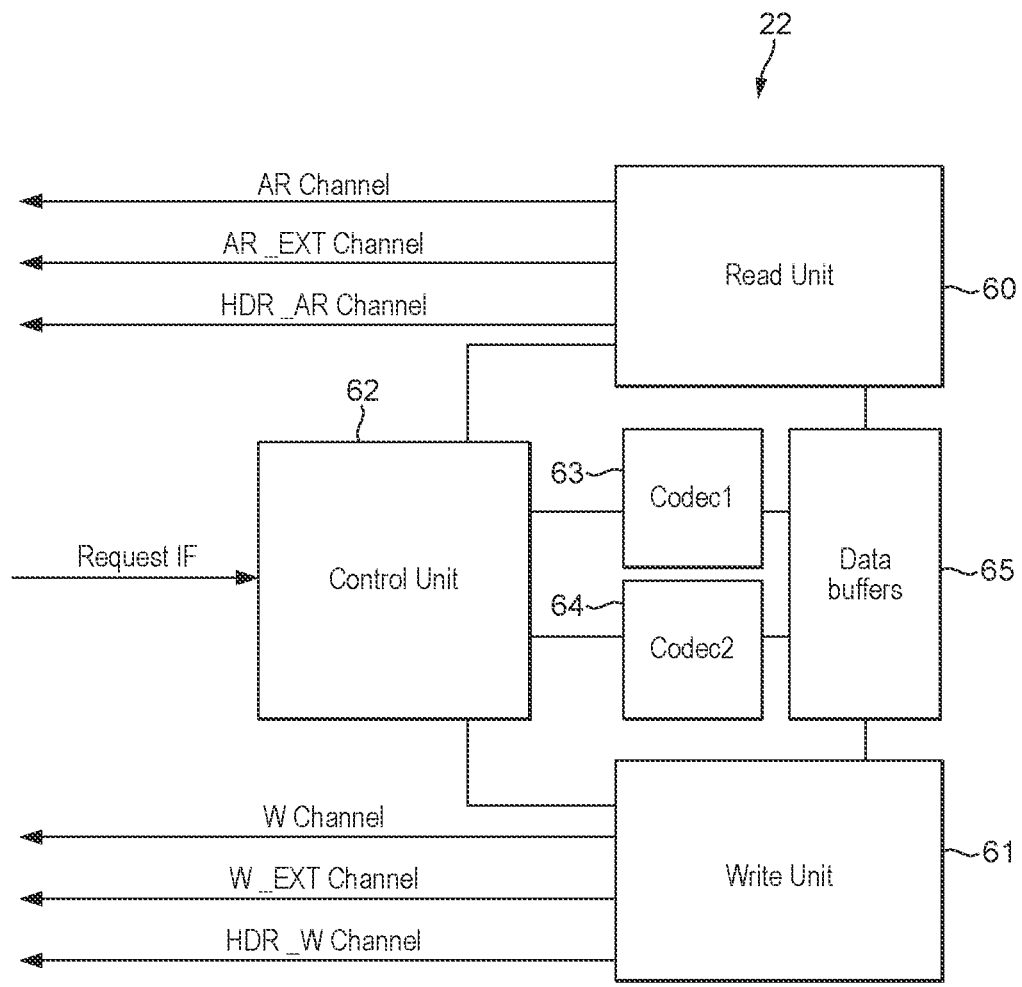
FIG. 10 shows an embodiment of a data encoder in more detail.

FIG. 10 shows an embodiment of the data encoder 12, 13, 14 in the present embodiments. As shown in FIG. 10, the (and each) data encoder includes respective read 60 and write 61 units (circuits) that are operable to, respectively, read data, e.g. from a cache and the memory system, and write data to a cache and to the memory system. The data encoder also includes an appropriate control unit (circuit) 62 that receives read and write requests and controls the data encoder (codec) to respond to those requests accordingly and appropriately.

As shown in FIG. 10, the data encoder also includes one or more codecs 63, 64 and a set of data buffers 65 for temporarily storing data in the data encoder while that data is processed and/or while waiting to write that data to a cache or the memory system.

The data encoder can include any desired number of codecs, e.g. that are each respectively operable to perform a different encoding (compression) scheme. For example, one codec may be configured to perform one variable rate compression scheme, with the other codec being configured to perform an alternative variable rate compression scheme.

For instance, whilst embodiments are described above in relation to a lossless variable rate compression scheme, and wherein the memory allocation corresponds to the size of the block when uncompressed, it would also be possible to apply to technology described herein to lossy variable rate compression schemes. In that case, the compression scheme may have a set maximum size to which it encodes. If the block can be encoded losslessly within that size, this is done. However, if the lossless compression will exceed the set maximum size, lossy encoding is then performed to ensure the compressed size meets the set maximum size for the lossy compression scheme. In that case, the memory allocation corresponds to the set maximum size for the blocks when compressed using the lossy variable rate compression scheme.

Other arrangements would, of course, be possible. As can be seen from the above, the technology described herein, in some embodiments at least, comprises a method and apparatus for storing data arrays that can allow the stored data to take less memory space (to be stored more efficiently), reduce the amount of memory traffic for reading the stored data, and/or make more efficient the memory traffic for reading the stored data. It can accordingly, thereby reduce power consumption and bandwidth on a system level.

This is achieved, in some embodiments at least, by providing respective memory allocations for blocks of a data array to be stored, with each such memory allocation being divided into a plurality of sub-blocks, comprising at least one larger sub-block and one smaller sub-block. Then, when storing a compressed version of a block of a data array, the appropriate sub-blocks from the memory allocation for the block are used to store the compressed data. The memory allocations and sub-blocks are in an embodiment aligned with appropriate memory transaction and memory channel address boundaries, so as to avoid transactions for individual sub-blocks crossing memory transaction and memory channel boundaries.

The data storage arrangement of the technology described herein is particularly suited to use for textures and frame buffers, and can decrease external bandwidth as well as facilitating random access to the stored data and being decodable at line speed, e.g. for the texture cache. The arrangement of the technology described herein, in some embodiments at least, allows the efficient fetching of the data for a given block within the overall data array, and with little overhead.

The technology described herein can also provide predictable memory read patterns for a display controller (when used as a frame buffer format) whilst still retaining random access possibilities for use for textures (for a texture mapper) for example. Using the same data storage format structure both for the frame buffer and for textures provides a more simplified system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of storing data of an array of data in memory in a graphics processing system in which respective blocks of the data array are compressed using a compression scheme and stored in memory once compressed, the method comprising:

for a block of the data array, allocating a region of memory for storing the block, the allocated region of memory corresponding to a maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;

compressing the block of the data array using the compression scheme;

and storing the compressed block of the data array in one or more of the sub-blocks of its allocated memory region.

2. The method of claim 1, wherein the data array comprises a frame to be displayed or a graphics texture, or wherein the data array comprises a machine learning feature map.

3. The method of claim 1, comprising:
dividing an array of data to be stored into a plurality of blocks;
for each block of the plurality of blocks, allocating a region of memory for storing the block, the allocated region of memory corresponding to a maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;
for each block of the plurality of blocks of the data array:
compressing the block using the compression scheme;
and storing the compressed block of the data array in one or more of the sub-blocks of its allocated memory region.

4. The method of claim 1, wherein the size of the larger sub-block is an integer multiple of the size of the smaller sub-block.

5. The method of claim 1, wherein the memory address ranges used for the sub-blocks are set such that a sub-block will not straddle a memory channel address boundary of the graphics processing system.

6. The method of claim 1, wherein the data array is divided into a plurality of blocks, and the method comprises:
for some but not all of the plurality of blocks:
allocating a region of memory for storing the block, the allocated region of memory corresponding to a maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;
and
for other blocks of the plurality of blocks:
allocating a region of memory for storing the block, the allocated region of memory corresponding to a maximum size of the block of the data array when compressed using the compression scheme, and comprising a single sub-block corresponding to the maximum possible size of the block of the data array when compressed using the compression scheme.

7. The method of claim 1, comprising storing a sub-block at an offset from a base memory address, which offset is based on an index for the block of the data array.

8. The method of claim 1, comprising determining a sub-block of the memory region allocated to a block of the data array to use to store the compressed block of the data array based on the size of the compressed block by:
determining whether the compressed block of data will fit within a sub-block having the second, smaller size of the allocated memory region, and, when so, storing the compressed block of the data array in that smaller sub-block only, but when it is determined that the compressed block will not fit within a single smaller sub-block, storing the compressed block of the data array starting with a larger sub-block of the memory allocation for the block of the data array.

9. The method of claim 1, further comprising:
storing a header for the compressed block of the data array, which header includes an indication of the size of the data that has been stored for the compressed block.

10. A method of providing an uncompressed version of a block of a data array from a compressed version of the block of the data array that has been compressed using a compression scheme and that has been stored in one or more sub-blocks of a region of memory allocated for storing the compressed block, the allocated region of memory corresponding to the maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;
the method comprising:
determining which sub-block or sub-blocks of the memory allocation for the block of the data array have been used to store the compressed block;
reading the determined sub-block or sub-blocks from the memory to obtain the compressed block of the data array;
decompressing the compressed block of the data array to generate an uncompressed version of the block of the data array; and
providing the uncompressed version of the block of the data array for use.

11. The method of claim 10, comprising:
determining which sub-block or sub-blocks of the memory allocation for the block of the data array have been used to store the compressed block by:
reading a stored header for the compressed block of the data array, and determining therefrom the size of the stored compressed block of the data array; and
using the indicated compressed size of the compressed block of the data array to determine the sub-block or sub-blocks of a memory allocation for the compressed block of the data array that the data for the compressed block is stored in.

12. The method of claim 1, wherein the compression scheme is a lossless variable rate compression scheme, and wherein the allocated region of memory corresponds to the size of the block of the data array when uncompressed.

13. An apparatus for storing data of an array of data in memory in a graphics processing system, the apparatus comprising:
a data encoder configured to:
compress respective blocks of a data array using a compression scheme; and
store blocks of a data array in memory once compressed;
and
a memory allocation circuit configured to:
allocate, for a block of a data array to be compressed and stored, a region of memory for storing the block, the allocated region of memory corresponding to the maximum size of the block of the data array when compressed using the compression scheme, and being divided into a plurality of memory allocation sub-blocks, comprising at least one sub-block having a first larger size and at least one sub-block having a second, smaller size, the sub-blocks for the allocation together providing a memory allocation corresponding to the maximum size of the block of the data array when compressed using the compression scheme;

wherein the data encoder is configured to, when it has compressed a block of a data array using the compressions scheme, store the compressed block of the data array in one or more of the sub-blocks of its allocated memory region.

14. The apparatus of claim 13, wherein the memory allocation circuit is configured to:
for each block of a plurality of blocks that a data array has been divided into, allocate a region of memory for storing the block, the allocated region of memory corresponding to the maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;

and the data encoder is configured to, for each block of the plurality of blocks of the data array:
compress the block using the compression scheme;
and store the compressed block of the data array in one or more of the sub-blocks of its allocated memory region.

15. The apparatus of claim 13, wherein the memory address ranges used for the sub-blocks are set such that a sub-block will not straddle a memory channel address boundary of the graphics processing system.

16. The apparatus of claim 13, wherein the memory allocation circuit is configured to:
allocate for some but not all of a plurality of blocks of a data array:
a region of memory for storing the block, the allocated region of memory corresponding to a maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;
and
for other blocks of the plurality of blocks:
allocate a region of memory for storing the block, the allocated region of memory corresponding to a maximum size of the block of the data array when compressed using the compression scheme, and comprising a single sub-block corresponding to the maximum size of the block of the data array when compressed using the compression scheme.

17. The apparatus of claim 13, wherein the data encoder is configured to store a sub-block for a block of a data array at an offset from a base memory address, which offset is based on an index for the block of the data array.

18. The apparatus of claim 13, wherein the data encoder is configured to determine a sub-block of the memory region allocated to a block of the data array to use to store the compressed block of the data array based on the size of the compressed block by:
determining whether the compressed block of data will fit within a sub-block having the second, smaller size of the allocated memory region, and, when so, storing the compressed block of the data array in that smaller sub-block only, but when it is determined that the compressed block will not fit within a single smaller sub-block, storing the compressed block of the data array starting with a larger sub-block of the memory allocation for the block of the data array.

19. The apparatus of claim 13, wherein the data encoder is configured to:
store a header for a compressed block of a data array, which header includes an indication of the size of the data that has been stored for the compressed block.

20. The apparatus of claim 13, wherein the apparatus supports a plurality of different compressed block sizes, with each supported maximum compressed block size having its own corresponding sub-block configuration that is used whenever that block size is being used.

21. A non-transitory computer readable storage medium storing computer software code which when executing on a processor performs a method of storing data of an array of data in memory in a graphics processing system in which respective blocks of the data array are compressed using a compression scheme and stored in memory once compressed, the method comprising:
for a block of the data array, allocating a region of memory for storing the block, the allocated region of memory corresponding to a maximum size of the block of the data array when compressed using the compression scheme, and being divided into a plurality of memory allocation sub-blocks, comprising at least one sub-block having a first, larger size and at least one sub-block having a second, smaller size, the sub-blocks for the allocation together providing a memory allocation corresponding to the maximum size of the block of the data array when compressed using the compression scheme;
compressing the block of the data array using the compression scheme;
and storing the compressed block of the data array in one or more of the sub-blocks of its allocated memory region.

* * * * *